United States Patent [19]

Hollis

[11] 4,343,667

[45] Aug. 10, 1982

[54] METHOD FOR MAKING AN INDEFINITE LENGTH COMPOSITE SHEET OF VERY LARGE PREDETERMINED WIDTH FROM INDEFINITE LENGTH SHEET STOCK OF RELATIVELY SMALL WIDTH

[75] Inventor: Jack L. Hollis, Mechanicsburg, Pa.

[73] Assignee: Carlisle Tire & Rubber Company, Div. of Carlisle Corp., Carlisle, Pa.

[21] Appl. No.: 255,894

[22] Filed: Apr. 20, 1981

Related U.S. Application Data

[60] Division of Ser. No. 140,815, Apr. 16, 1980, which is a continuation-in-part of Ser. No. 20,133, Mar. 13, 1979, abandoned.

[51] Int. Cl.³ .............................................. B32B 31/18
[52] U.S. Cl. .................................... 156/157; 156/258; 156/264; 156/266; 156/304.1; 156/351; 156/353; 156/512; 156/517
[58] Field of Search .............. 156/157, 159, 258, 264, 156/266, 304.1, 353, 507, 512, 517, 535, 546; 52/518, 519, 540

[56] References Cited

U.S. PATENT DOCUMENTS

| | | | |
|---|---|---|---|
| 3,607,576 | 9/1971 | Phillips | 156/507 |
| 3,630,803 | 12/1971 | Printz | 156/296 |
| 3,803,965 | 4/1974 | Alderfer | 83/155 |
| 4,087,308 | 5/1978 | Baugher et al. | 156/405 R |

Primary Examiner—Caleb Weston
Attorney, Agent, or Firm—Wood, Herron & Evans

[57] ABSTRACT

An apparatus and method is disclosed for making a composite sheet of indefinite length and very large predetermined width from indefinite length sheet stock of relatively small width. Included is a supply roll of relatively narrow indefinite length synthetic rubber sheet material, and a conveyor which feeds out in a horizontal direction past a cutter a sheet of the narrow stock equal in length to the relatively large width of the desired composite sheet stock. After feeding out and cutting the desired length of narrow stock, the cut sheet is transferred laterally by a reciprocating vacuum pickhead to overlap the leading edge thereof with the trailing edge of the preceding laterally shifted cut sheet, effectively augmenting the composite sheet. A conveyor advances the composite sheet in the transverse direction to successively locate the lap joints therein at a lap joint pressing station whereat the lap joints are successively pressed to enhance the permanency of the joints. The composite sheet is then fed through a release powder applicator which applies release powder to both sides of the sheet to avoid the composite sheet stock, which is uncured, from sticking together when stored in roll form. Downstream of the release powder applicator the composite sheet is fed through a variable tension regulator, a sheet slitter which trims the stock to the desired width, and a composite sheet reeling station where it is rolled on a mandrel for subsequent storage and curing. Intermediate the supply roll of narrow length stock and the sheet cutter a station is located for facilitating convenient removal of defective portions of the narrow width supply stock.

35 Claims, 42 Drawing Figures

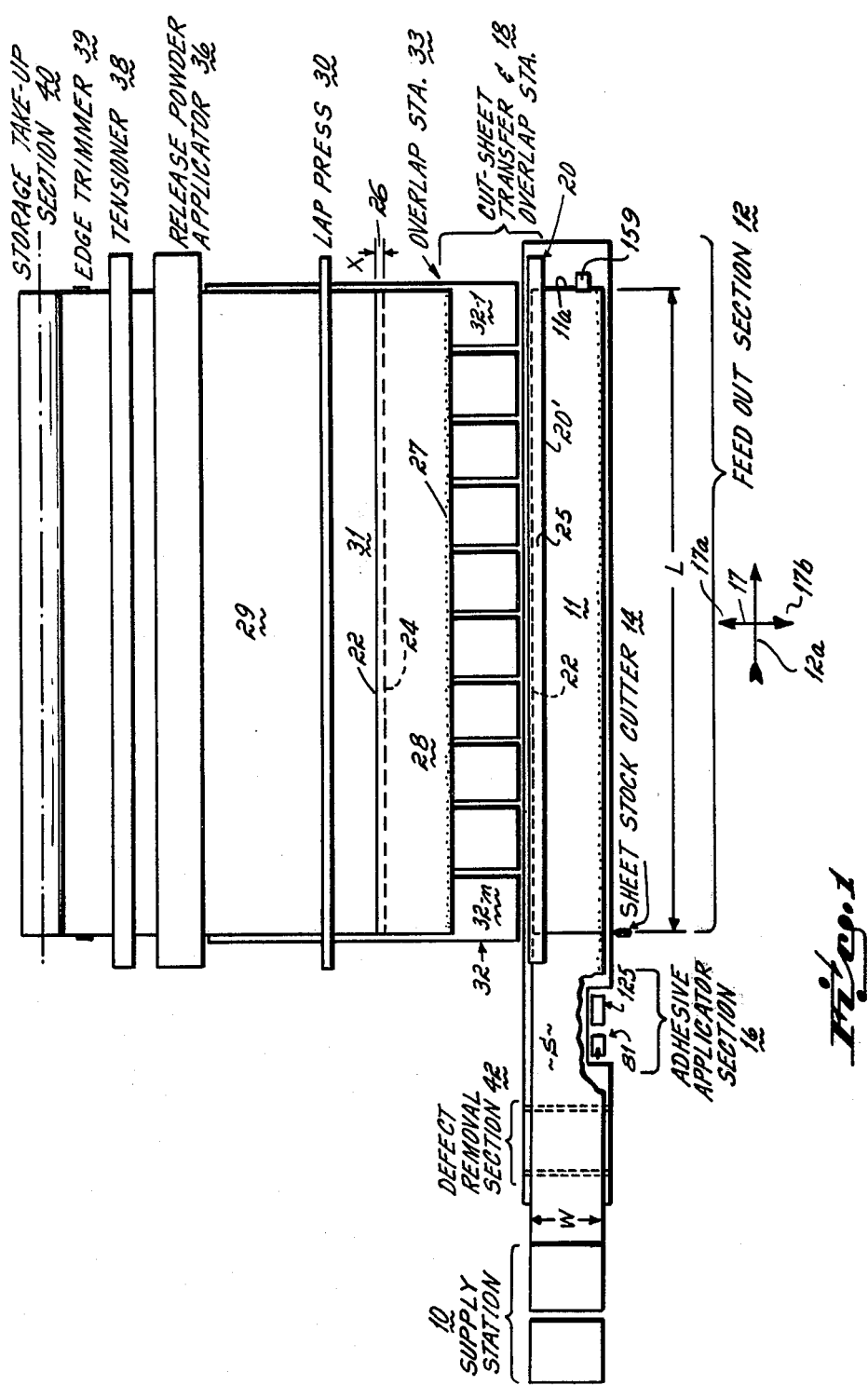

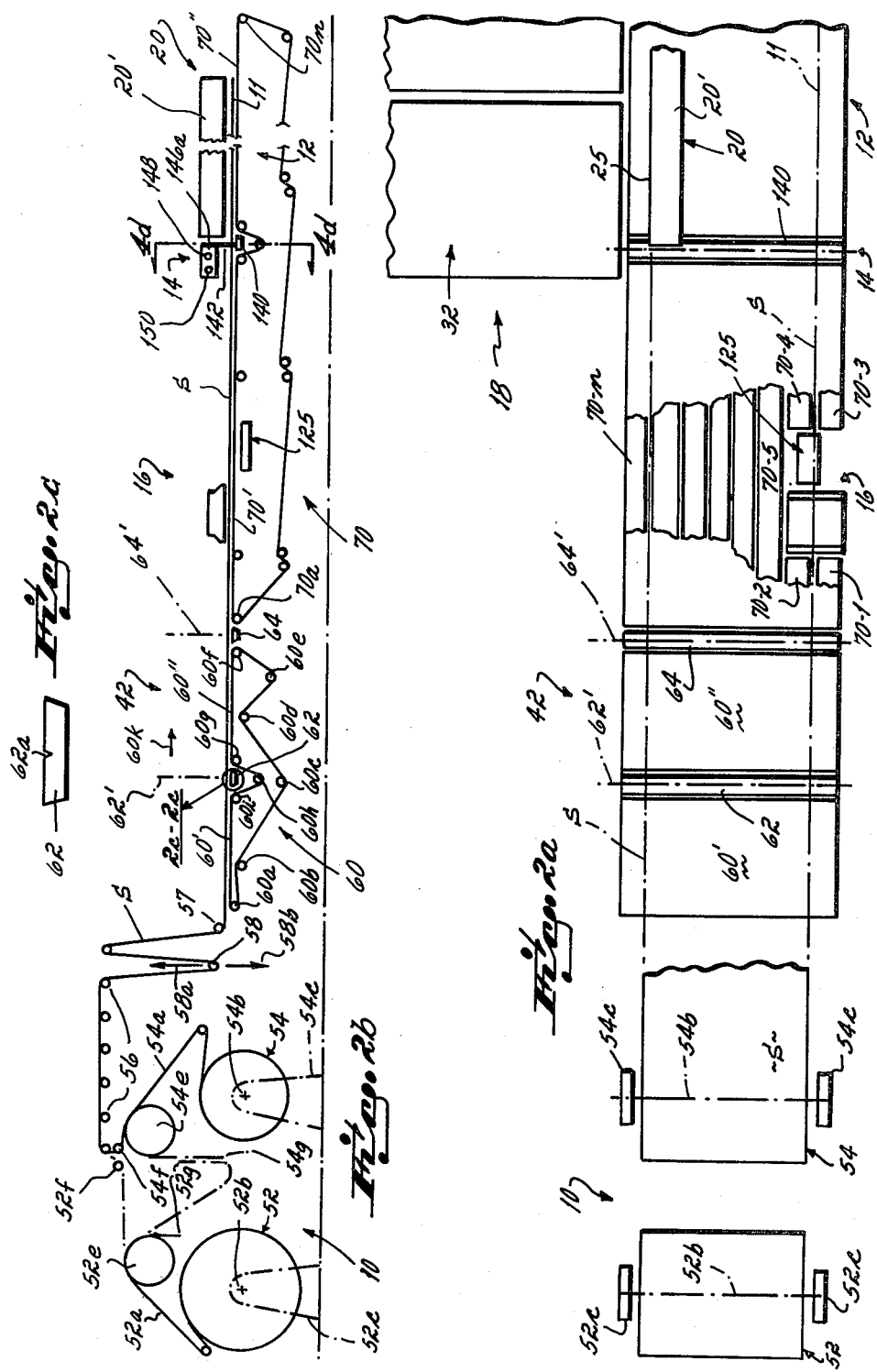

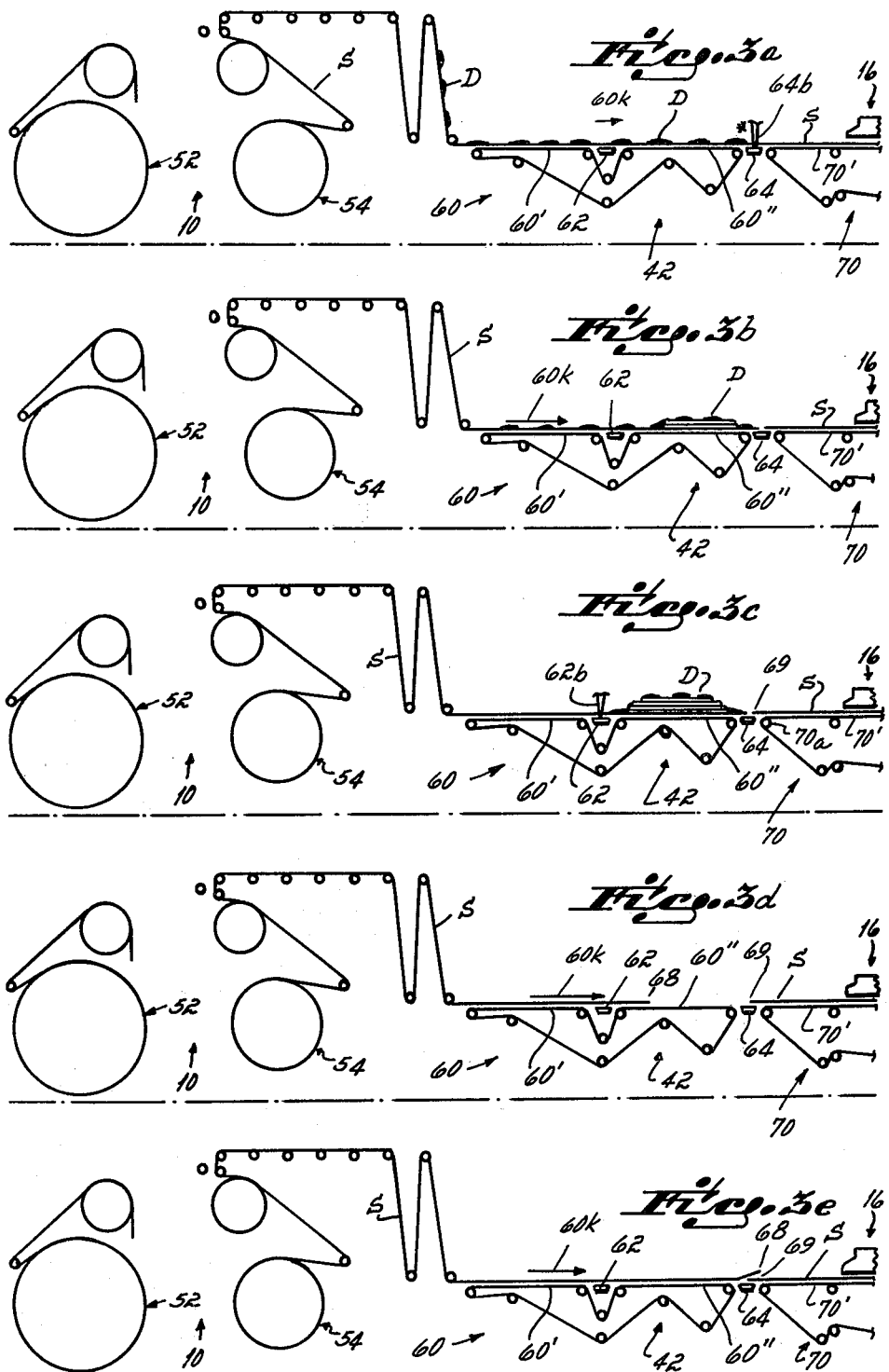

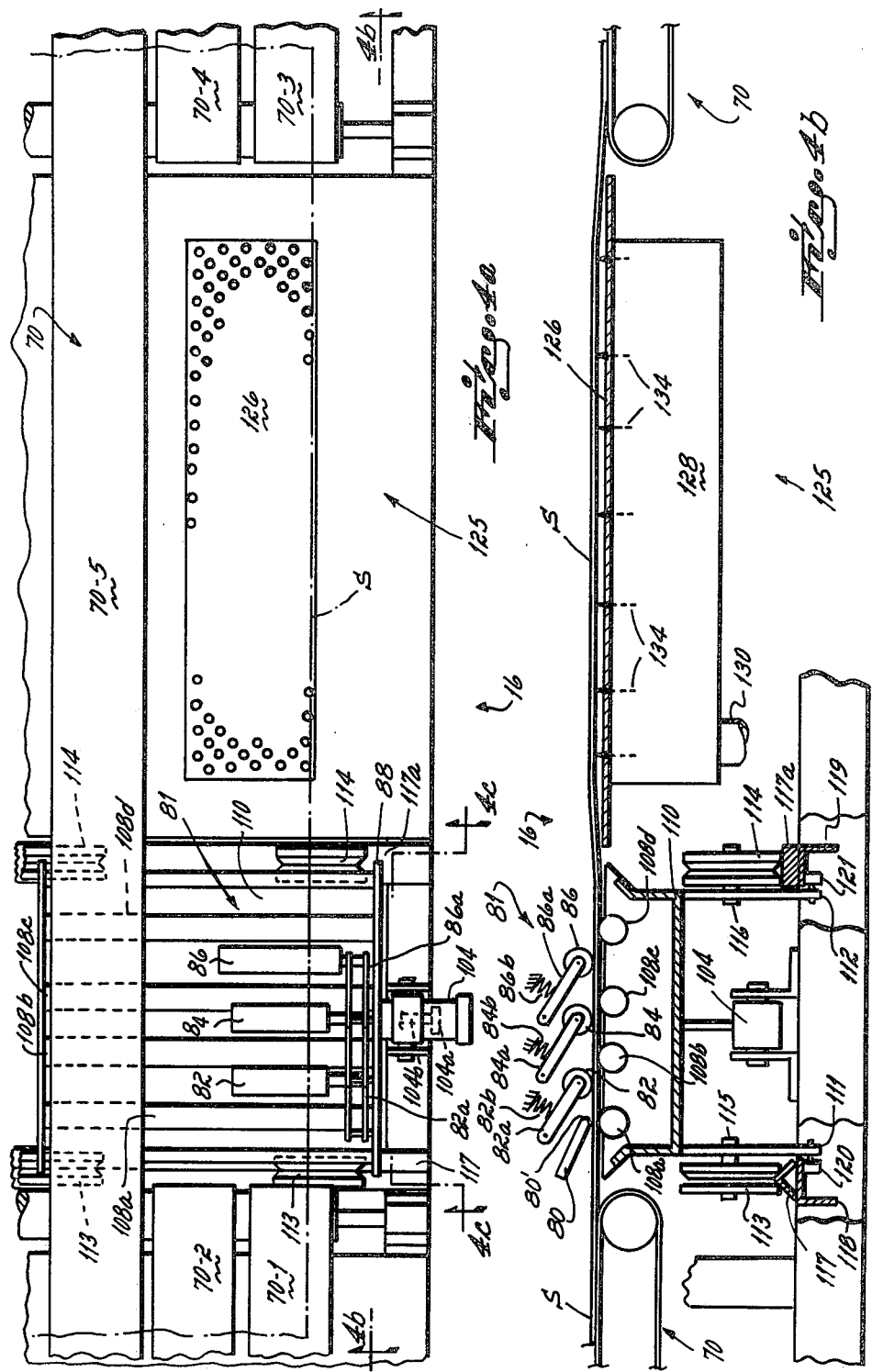

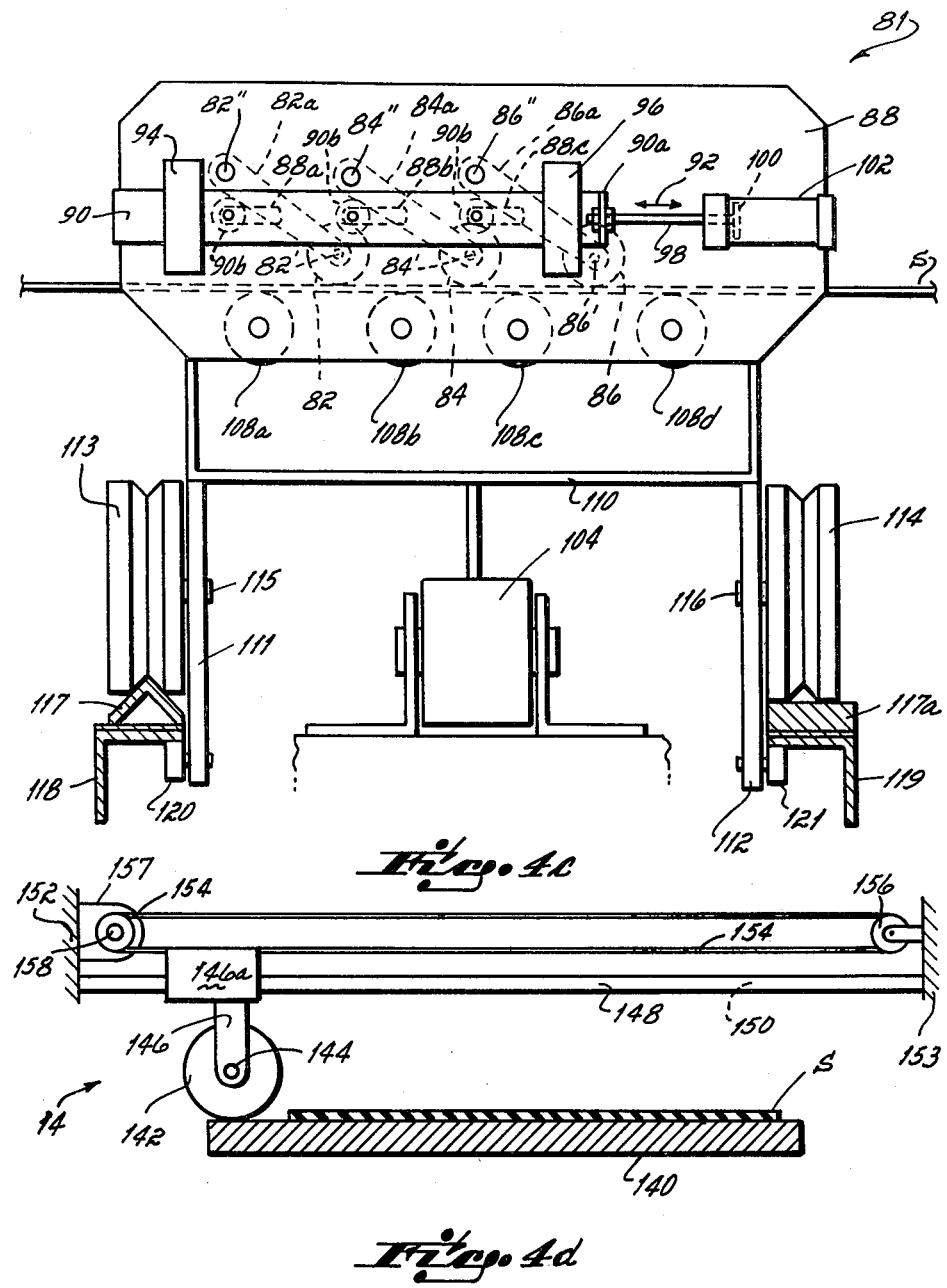

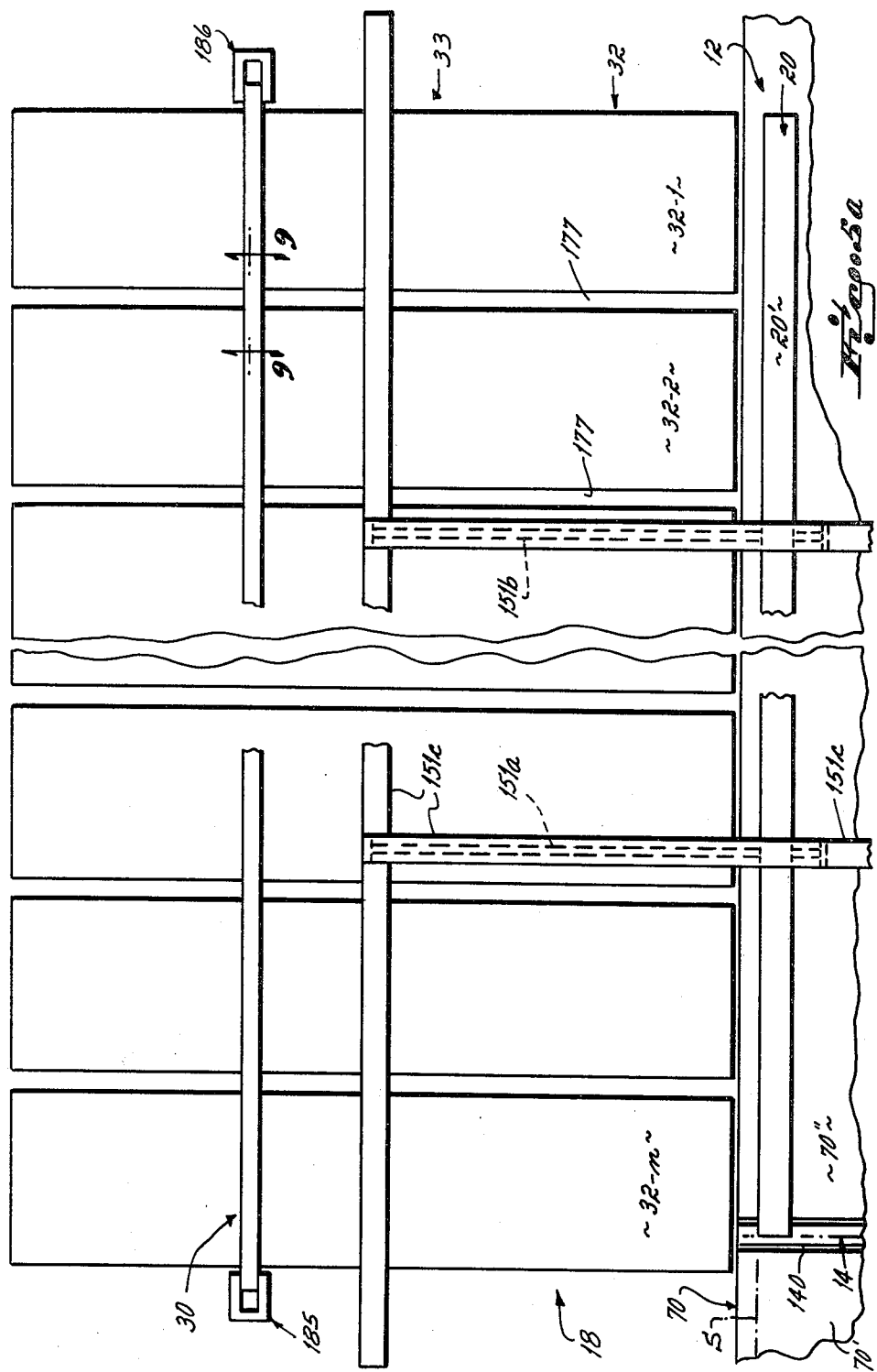

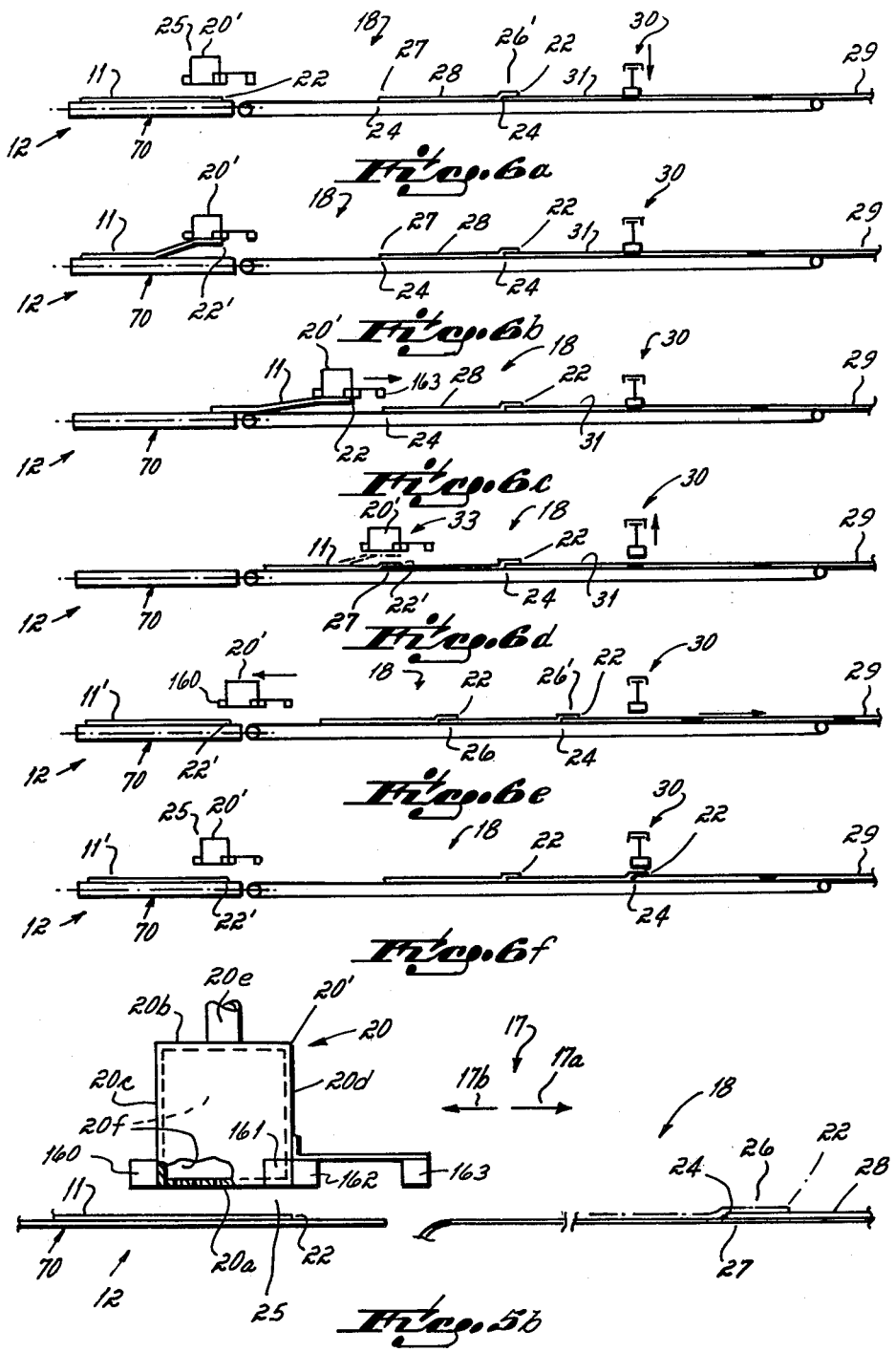

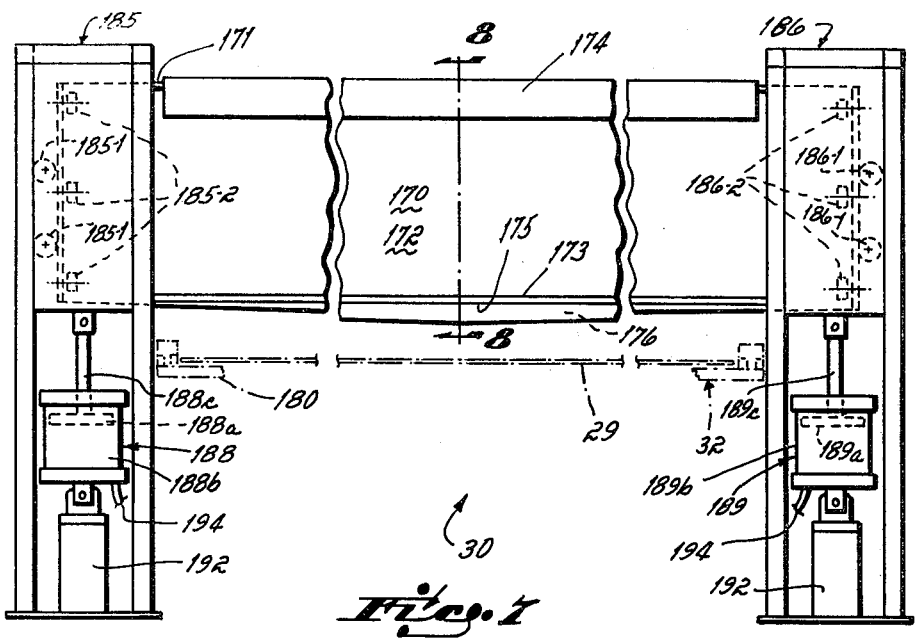
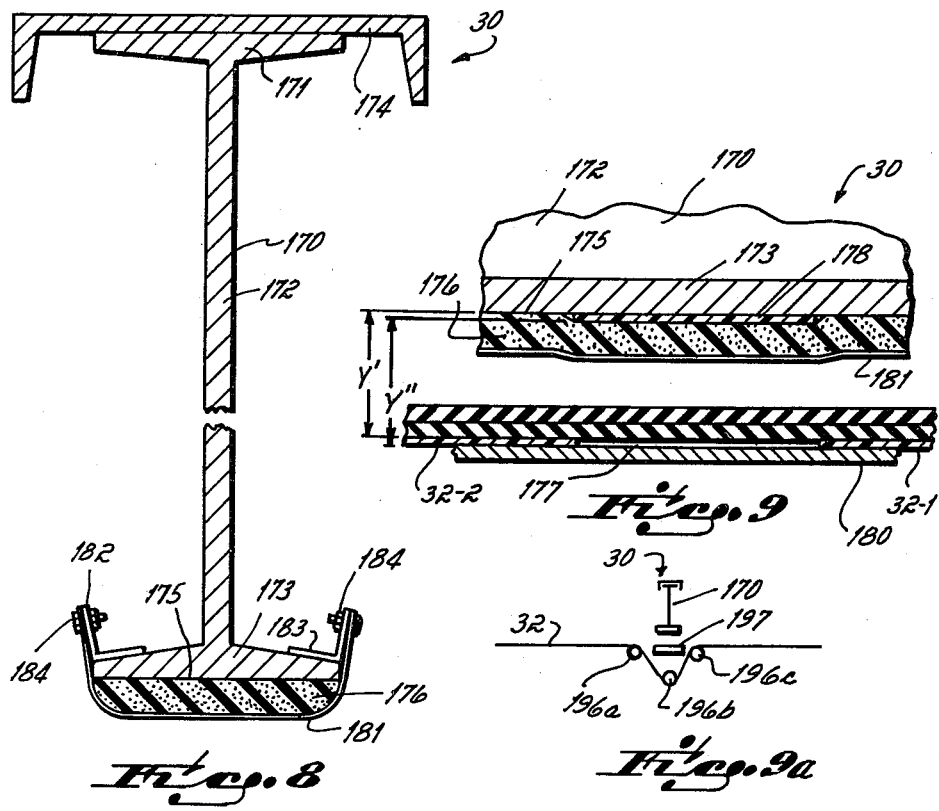

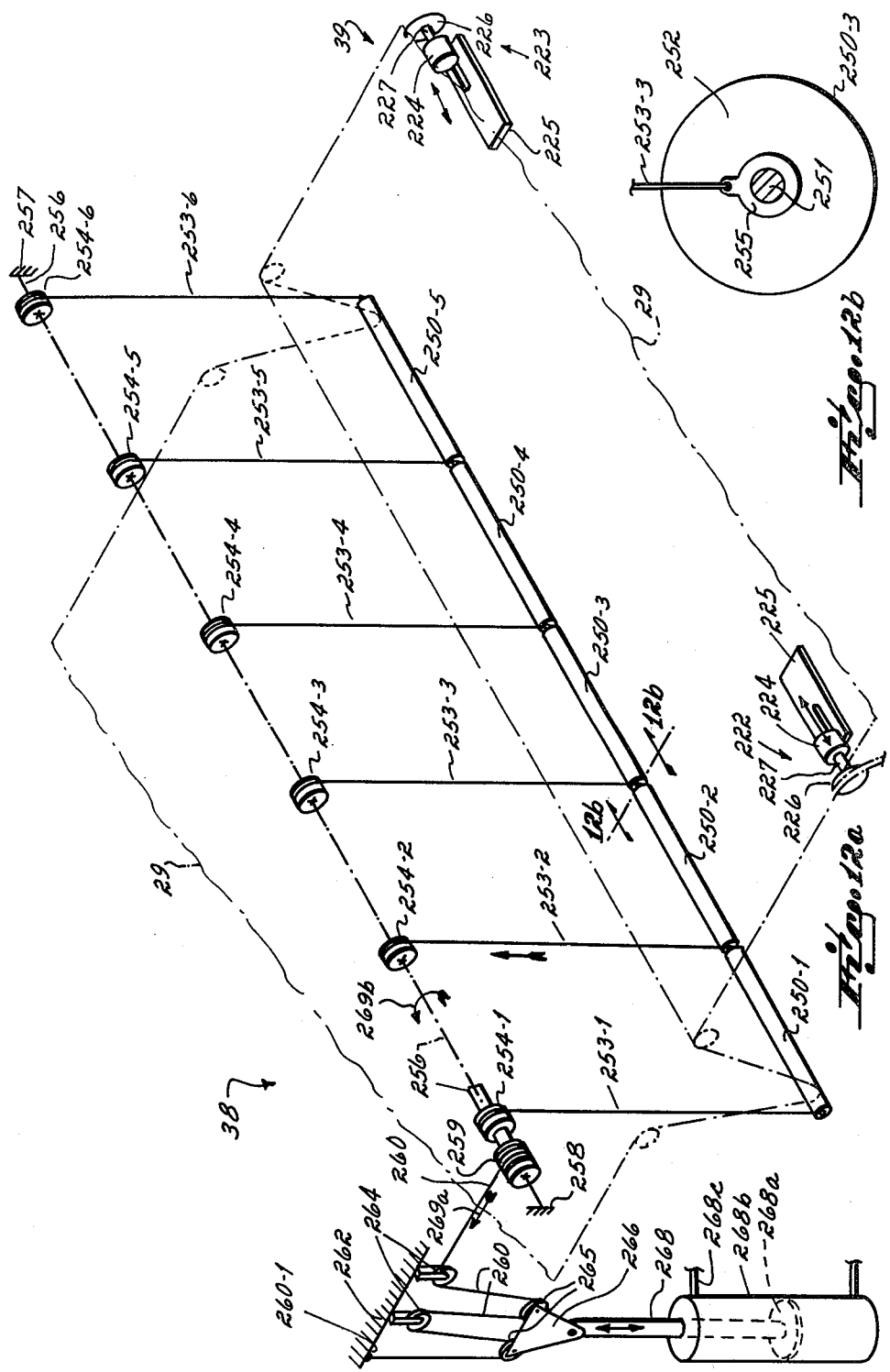

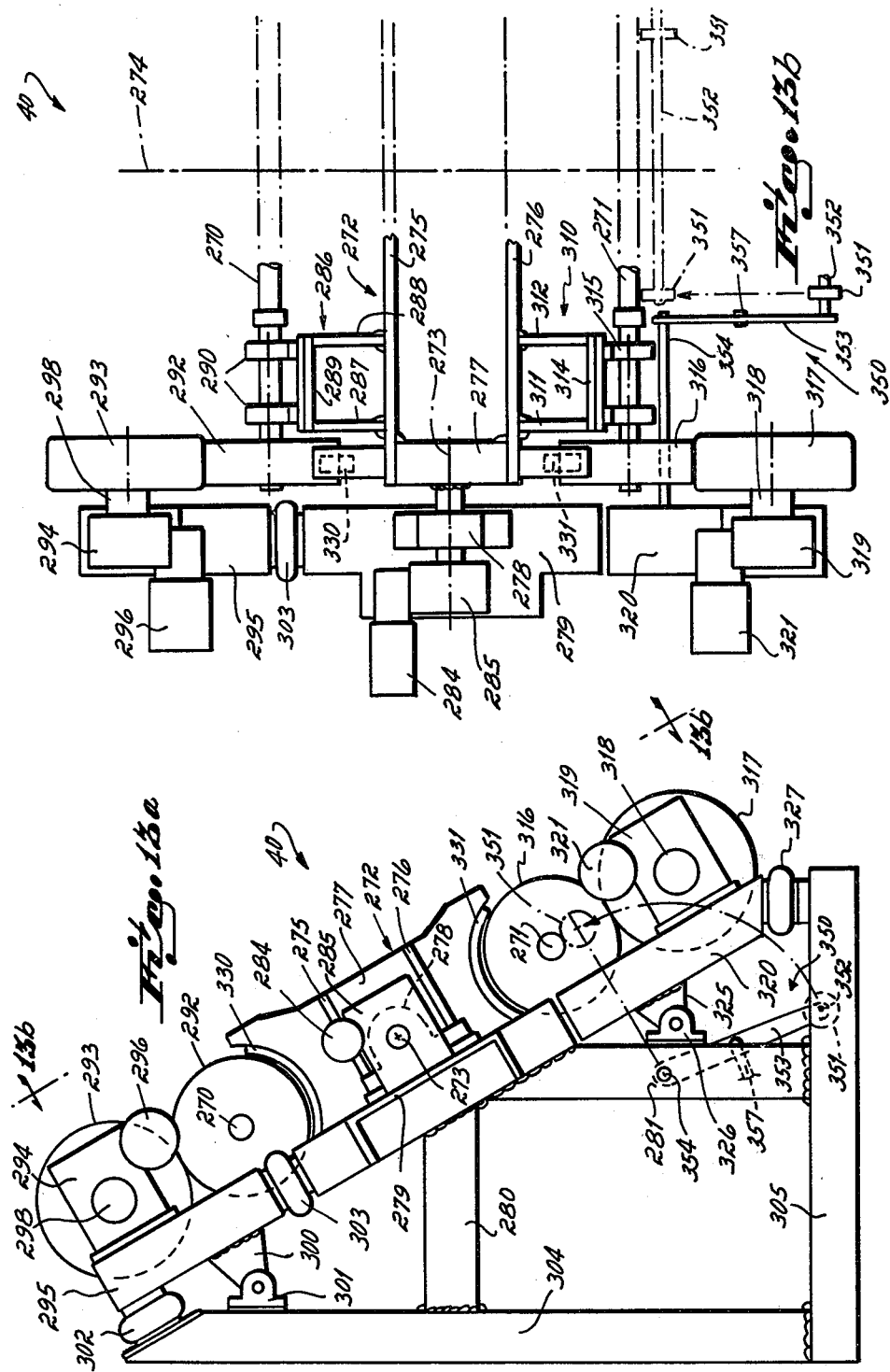

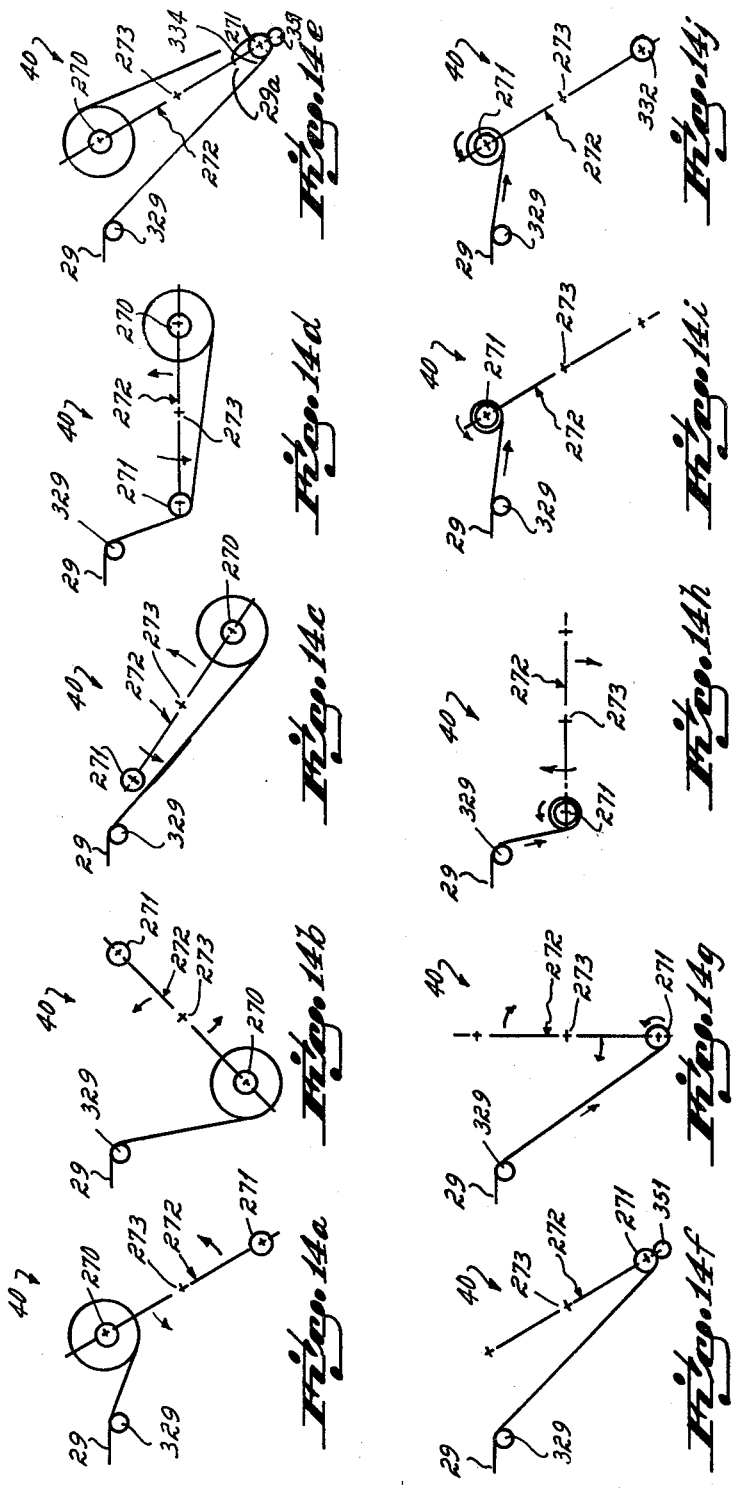

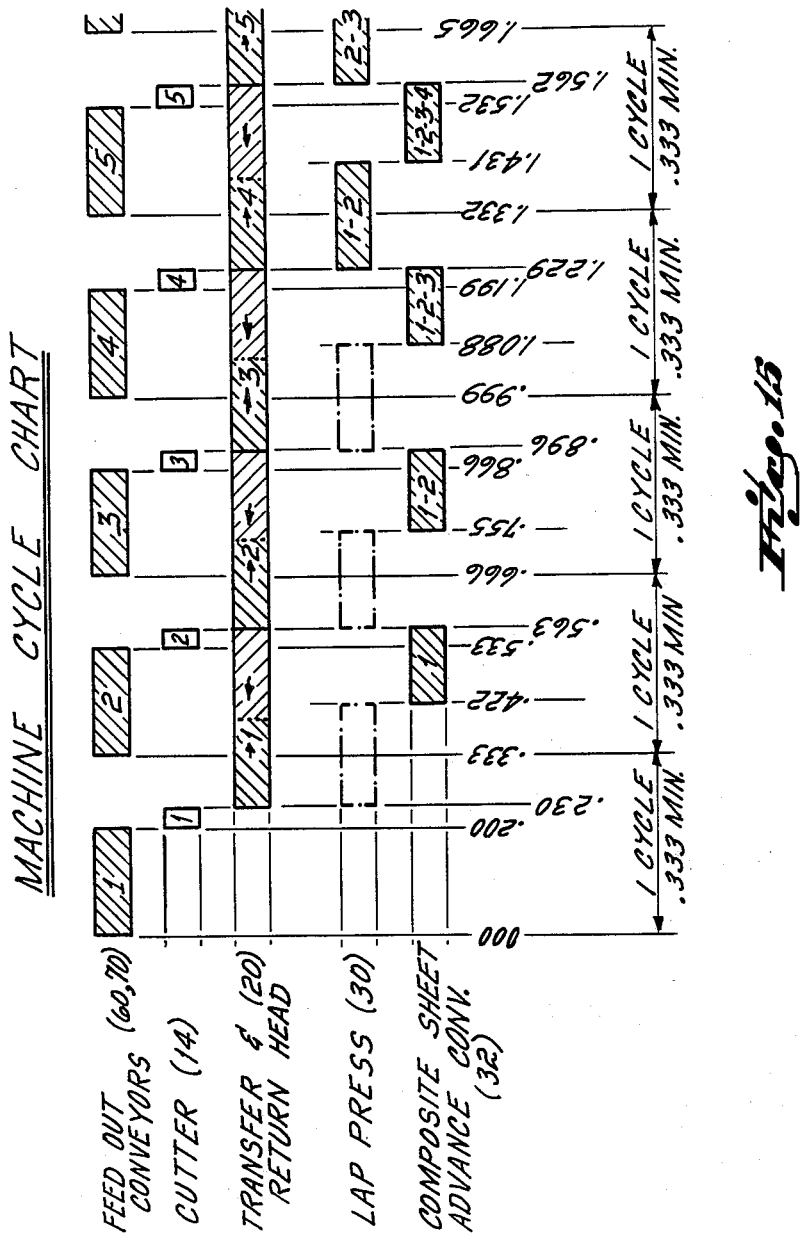

METHOD FOR MAKING AN INDEFINITE LENGTH COMPOSITE SHEET OF VERY LARGE PREDETERMINED WIDTH FROM INDEFINITE LENGTH SHEET STOCK OF RELATIVELY SMALL WIDTH

This is a division, of application Ser. No. 140,815, filed Apr. 16, 1980, which is a continuation-in-part application of Ser. No. 20,133 now abandoned, filed Mar. 13, 1979, entitled RUBBER SHEETS.

This invention relates to a method and apparatus for providing indefinite length stock of very large width from indefinite length stock of relatively narrow width.

Synthetic rubber sheeting material having a thickness between 1/16 inch and 3/32 inch has been found to constitute an extremely useful waterproof roofing material, particularly for industrial and commercial buildings having relatively flat roofs of very large size. Typically, the material comes in rolls and is rolled on in strips running the length of the building with a slight overlap between adjacent strips to provide a lap joint. Unfortunately, in the past such roofing material has typically been available only in rolls of relatively narrow width, for example, four feet wide. For a roof of large dimensions, such as 200 feet×400 feet, the time required to apply the roofing material strips of narrow width becomes excessive and, in light of today's high labor costs, intolerable from a commercial standpoint. To reduce the application time, and hence the cost, of roofing with synthetic rubber sheet stock, it is desirable, if not necessary, to provide the sheet stock in rolls of very large width, such as forty feet wide. With sheet stock of such width, a roof measuring 200 feet×400 feet can be applied in five 40-foot×200-foot strips. The time required to roof a building in this manner is a mere fraction of that heretofore necessary with sheet stock of narrow width, e.g., 4 feet wide.

Accordingly, it has been an objective of this invention to provide indefinite length sheet stock of synthetic rubber of extremely large width, e.g., forty feet. This objective has been accomplished in accordance with certain of the principles of this invention by providing means to feed out in a horizontal direction from a roll or like supply a predetermined length of narrow width stock, the length being equal to the relatively large width of the desired stock, and while feeding out the narrow width stock to form an adhesive area along the face thereof adjacent one edge. Also included are means to cut the narrow width stock when the predetermined length sheet has been fed out and adhesive applied thereto, and means to move the cut length of sheet, prior to cutting a successive predetermined length sheet, a predetermined distance in a horizontal direction transverse to the direction of feed of the narrow width stock to an overlap station whereat the cut length of sheet overlaps and forms a lap joint with a prior cut length of sheet, providing a composite sheet of very large width equivalent to the length of the narrow cut sheet. Means are also provided for successively advancing the composite sheet in the same transverse direction a distance at least equal to approximately the width of the narrow stock sheet less the width of the overlap zone to successively position the lap joints at a pressing station whereat the lap joints are successively pressed to enhance the permanency of the joints. Following pressing, the large width composite sheet stock is stored, such as in roll form, on a mandrel.

To minimize cycle time, when a freshly cut sheet is being transferred to the overlap point, the stock for the next sheet is being fed out and cut. Also, during this same period, the lap press and composite sheet advance operations which occur on a sequential basis, both take place. In addition, to reducing cycle time, lap joint pressing during cut sheet transfer maximizes the time duration that a previously lapped joint can be pressed by the lap press. Another advantage, attributable to immediate lateral transfer of the cut sheet following cutting, is that there is never more than one extended length narrow sheet in the feed-out section downstream of the cutter. As a consequence, the length of the machine in the feed-out direction is not excessive, as would occur, for example, if several extended length sheets were cut before the first lateral transfer occurred.

In accordance with a further aspect of the invention, the lap joint press is located downstream of the point where the freshly cut sheet is overlapped with the trailing edge of the composite sheet by a distance equal to at least twice the distance between adjacent lap joints. This permits visual inspection of a lap joint prior to action by the lap press, and if the lap is defective, stoppage of the machine and manual correction of the lap joint before pressing.

Another advantage of this invention, attributable to the fact that the cut sheet is fed out in a horizontal direction and the cut sheet then conveyed transversely in a horizontal direction, is that the vertical dimension, or height, of the machine, is not excessive. For example, assuming the length of the cut sheet (width of the composite sheet) is 35–40 feet, were the sheet not fed out horizontally, but rather vertically, the machine height, which must equal the feed-out dimension of the sheet, would be 35–40 feet. Such a machine height would require a building of at least the same height, which is clearly an undesirable situation. Another advantage of feeding out the sheet stock in a horizontal direction is that it does not stretch under its own weight, as occurs if vertical feed is employed, and introduce dimensional inaccuracies.

A still further advantage of applicant's invention, attributable to the fact that the lap joint pressing station is located downstream from the point where the lap joint is formed, is that the duration of the pressing operation can constitute a substantial portion of the time necessary to effect a complete cycle of the cut sheet transfer mechanism, that is, a substantial portion of the total time required for the transfer mechanism to move a freshly cut sheet downstream to the overlap point and return to the pick-up point. By providing a longer interval for lap joint pressing, the amount of pressure required to establish an effective lap joint can be reduced. This reduces the force requirements of the joint pressing apparatus as well as avoids deformation and damage of the material at the joint being pressed. Additionally, if the lap joint pressing operation involves application of a press member at an elevated temperature, by using a longer duration pressing step the temperature of the press member can be reduced, which in turn reduces the heating requirements of the press, as well as minimizes the risk of thermal degradation of the sheet material at the joint being pressed.

In accordance with a further feature of the invention, the cut sheet transfer mechanism includes an elongated vacuum pick-up head which spans the width of the composite sheet and moves in a horizontal plane between a cut sheet pick-up point, whereat the edge of the cut sheet is lifted and gripped solely by vacuum force, and a downstream deposit/overlap point, whereat the leading edge of the cut sheet is released by termination of at the transfer head. The lower surface of the pick-up head is spaced above the sheet material. As a result, vacuum pick-up of the leading edge of the freshly cut sheet occurs without lowering the head against the sheet on the feed-out table, and any irregularities in the lower surface of the transfer head which is desirably not machined flat, does not damage the sheet.

Another advantage of the vacuum transfer head, attributable to the fact that the cut sheet is gripped only at its leading edge, is that as the transfer head moves downstream to the overlap position it drags the cut sheet by the leading edge. Gripping a cut sheet at only the leading edge minimizes the area of the sheet to which vacuum must be applied by the transfer head, thereby producing a substantial reduction in the size, and hence the cost, of the transfer head. Additionally, by dragging the sheet by its leading edge to the overlap position, wrinkles which may be present in a cut sheet are removed.

A further advantage of the transfer head of this invention, attributable to the fact that the leading edge of the cut sheet, when overlapped with the trailing edge of the spliced sheet, is released by terminating vacuum and allowing the edge to float down onto the underlying sheet solely under the force of gravity, is that it avoids bringing the bottom surface of the vacuum transfer head down against the lap joint, in turn preventing the lap joint from being pressed before it can be visually inspected, and if necessary manually corrected. It also prevents damage to the lap joint due to irregularities in the bottom surface of the unmachined vacuum transfer head.

In accordance with a further aspect of the invention, an optical sensor is provided on the transfer head which detects the leading edge of the cut sheet prior to application of vacuum when the transfer head is in proper alignment with the edge of the cut sheet at the pick-up station. This permits the edge to be gripped at the proper location notwithstanding variations in sheet width and wander of the edge of the cut sheet. An optical sensor on the transfer head also detects the trailing edge of the spliced sheet as the freshly cut sheet in being moved into the overlap position and thereafter moves a predetermined distance equivalent to the desired overlap before releasing the sheet. This assures a predetermined overlap regardless of variations in the initial position of the leading edge of the cut sheet at the time it is picked up for transport by the transfer head, and/or variations from cycle-to-cycle in the position of the trailing edge of the composite sheet when the transfer head releases the cut sheet.

The lap press is preferably a structural I-beam extending across the entire width of the composite sheet. This materially reduces the cost of the lap press. To enhance the uniformity of pressure applied to the lap joint by the bottom surface of the lap press when in its lower, lap joint pressing position, a foam pad is provided along the bottom surface of the I-beam along the length of the lap press. The foam pad avoids damage to the lap joint which might otherwise occur during a pressing operation due to irregularities in the bottom surface of the structural I-beam which is not a machined surface.

A unique release powder applicator is provided for applying release powder to opposite sides of the composite sheet prior to storing it in roll form. The release powder applicator includes a first guide roll horizontally supporting the composite sheet at a first location and a second guide roll horizontally supporting the composite sheet at a second location higher than the first location, with the first and second guide rolls cooperating to provide a first substantially vertical path through which the composite sheet passes in travelling from the first guide to the second guide, and a first release powder applicator located upstream of the second guide for applying release powder to a first surface of the composite sheet which is uppermost between the first and second guide rolls. Also provided is a third guide roll horizontally supporting the composite sheet at a third location higher than the second location, with the second and third guide rolls cooperating to provide a second substantially vertical path through which the composite sheet passes in travelling from the second guide to the third guide, and a second release powder applicator located to apply release powder between the second and third guides to a second surface of the composite sheet opposite the first surface.

By reason of the locations of the guide rolls, which provide vertical paths for the composite sheet as it moves therebetween, excess powder from the first applicator accumulating on the first surface is not transported by the composite sheet to the second guide roll. Similarly, excess powder from the second applicator accumulating on the second surface of the composite sheet is not transported by the composite sheet to the third guide roll. This avoids excess accumulated powder from being fed into the nips between the composite sheet and the second and third guide rolls, and in turn the sticking of accumulated excess powder to the second and third guide rolls which, if permitted to occur, would produce undesired indentations in the composite sheet guiding thereover.

In accordance with a further aspect of the invention designed to facilitate convenient removal of defective stock upstream of the cutter, first and second horizontal conveyors arranged end-to-end are provided between the sheet stock supply and the cutter. A first sheet severing means is located between the first and second conveyors for severing the stock downstream of a defect. A second sheet severing means located upstream of the downstream end of the first conveyor is provided for severing the stock upstream of the defect. Further included are drive means for alternatively (a) driving the first and second conveyors in synchronism to advance the stock sheet at the same speed relative to the first and second severing means and the stock cutter, or (b) driving only the first conveyor to advance the stock sheet to accumulate defective stock between the first and the second sheet severing means, and thereafter advance the leading edge of the stock sheet from the second stock severing means toward the trailing edge of the stock sheet at the first stock severing means to facilitate joinder thereof after accumulating and removing the defective stock between the first and the second stock severing means.

In accordance with a preferred form of the invention, the adhesive applicator provides at least one bead of adhesive to the edge region of the upper surface of the stock as it is being fed out. A roller selectively positionable in contact with the adhesive-bearing stock spreads the bead out to provide a wider adhesive zone. Underlying the adhesive bead applicator and spreading roll are a plurality of air jets which direct air upwardly against the lower surface of the stock underlying the adhesive-bearing portion to float it on air and prevent adhesive from contacting the underlying stock feed-out conveyor downstream of the adhesive application point. Means are provided for elevating the adhesive-spreading roll upwardly out of contact with the adhesive-bearing stock when the stock stops, such as to remove a defect upstream of the cutter, or when stock is not being fed although the feed-out conveyor may be operative. This avoids the adhesive-spreading roll from sticking to the stopped adhesive-bearing stock and/or to the stock feed-out conveyor.

In accordance with a further aspect of the invention means are provided downstream of the release powder applicator for maintaining proper tension on the composite sheet as it is input to the take-up roll. The tensioning apparatus includes a plurality of horizontal tension rolls arranged end-to-end transverse to the direction of movement of the composite sheet and suitable connector means interconnecting the tension rolls in end-to-end relation. Also provided are a plurality of support elements rotatably supporting the tension rolls for generally coaxial rotation about a common horizontal axis transverse to the direction of movement of the composite sheet. A plurality of vertical suspension elements, preferably flexible cables, are connected at their lower ends to different ones of the support elements and at their upper ends to a spool rotatable about a horizontal axis for supporting the plural tension rolls at selectively variable common elevations to maintain a predetermined tension in the composite sheet regardless of the exact elevation of the tension rolls. By merely reeling or unreeling the flexible cables with the elongated horizontal spool, the height of the end-to-end tension rolls can be varied to maintain the tension in the composite sheet at the desired level regardless of variations in elevation thereof introduced by mismatch between the linear feed rates of the sheet.

An important advantage of the foregoing tensioning apparatus is that it permits the tension to be controlled across a composite sheet of very great width with a relatively lightweight tension roll. Were the plural rolls supported at spaced intervals of this invention not used, a tension roll of enormous dimensions supported at its opposite ends would be required to avoid sagging and the attendant nonuniformity in tension across the composite sheet which results from sagging.

In accordance with a further aspect of the invention designed to simplify and shorten the time necessary to substitute an empty roll for a full roll at the take-up station, a pair of horizontal take-up rolls are provided having a length at least equal to the predetermined width of the composite sheet. The take-up rolls are mounted for rotation about their respective axes in spaced apart parallel relation generally perpendicular to the direction of movement of the composite sheet in a turret which itself is rotatable about a horizontal axis generally perpendicular to the direction of sheet movement. When the turret rotates about its axis, the first and second take-up rolls simultaneously move through a circular path. This permits the composite sheet being reeled onto the full roll to partially wrap around the other empty roll. When the composite sheet is severed between the rolls, the partially wrapped composite sheet can be conveniently reeled onto the empty roll and the full roll removed and replaced with another empty roll. Also included are means for driving the take-up rolls about their respective axes to reel the composite sheet thereon, as desired.

In practice, it has been found that the dual roll turret scheme of this invention permits the composite sheet to be severed across its entire width and connected to a new fresh empty take-up roll in approximately thirty seconds. This is in contrast to 5–10 minutes heretofore necessary when only a single roll, mounted at its opposite ends between stationary supports, was utilized.

These and other features, advantages, and objectives of the invention will become more readily apparent from a detailed description thereof taken in conjunction with the drawings in which:

FIG. 1 is a top plan view of the apparatus of this invention schematically illustrating the relationship of the various components thereof;

FIG. 2a is a top plan view of the upstream end of the apparatus from the stock supply through the stock cutter;

FIG. 2b is a front elevational view of the upstream end of the apparatus from the stock source through the stock cutter;

FIG. 2c is an enlarged detail of the encircled area 2c—2c of FIG. 2b.

FIGS. 3a–3e are front elevational views of the upstream end of the apparatus illustrating the sequence of steps utilized in removing a defect in the stock prior to reaching the stock cutter;

FIG. 4a is a top plan view of the upstream end of the apparatus showing the adhesive bead applicator, adhesive bead spreader, and an air bearing unit which floats the edge region of the adhesive-bearing stock above the sheet conveyor.

FIG. 4b is a cross sectional view of a portion of the upstream end of the apparatus showing the adhesive bead applicator, adhesive spreader, and air bearing unit which floats the adhesive-bearing edge region of the sheet stock above the sheet conveyor taken on line 4b—4b of FIG. 4a.

FIG. 4c is a front elevational view of the adhesive bead applicator and bead-spreading mechanism taken on line 4c—4c of FIG. 4a.

FIG. 4d is a front elevational view of the sheet stock cutter taken on line 4d—4d of FIG. 2a.

FIG. 5a is a top plan view of the transfer mechanism for transferring a cut sheet transversely of the feed-out direction for overlap with the composite sheet, and of the lap press which presses the lap joint between two cut sheets.

FIG. 5b is a side elevational view of the sheet transfer mechanism.

FIGS. 6a–6f are side elevational views schematically depicting the sequence of operations and relative positions of the cut sheet transfer mechanism in the course of transferring a cut sheet from the feed-out table to a position overlapping the trailing edge of the composite sheet.

FIG. 7 is a front elevational view of the lap press.

FIG. 8 is a cross-sectional view along line 8—8 of FIG. 7 through the lap pressing element.

FIG. 9 is a cross-sectional view along line 9—9 of FIG. 5a showing the lower portion of the lap press and a portion of a lap joint bridging the space between two conveyor belts which underlie it.

FIG. 9a is a diagrammatic illustration of an alternate lap press and anvil structure.

FIG. 12a is a perspective view of the side and rear of a tensioning mechanism for the composite sheet located between the release powder applicator section and the take-up roll section.

FIG. 12b is a cross-sectional view along 12b—12b of FIG. 12a showing the manner in which the variable height tension rolls are supported by a flexible cable.

FIG. 13a is a side elevational view of the take-up roll assembly. FIG. 13b is a view along lines 13b—13b of FIG. 13a.

FIGS. 14a–14j are side elevational views schematically showing the components of the take-up roll mechanism in the various positions they assume in the course of switching the composite sheet from a full take-up roll to an empty take-up roll, and substitution of an empty take-up roll for a full take-up roll.

Figure 10:
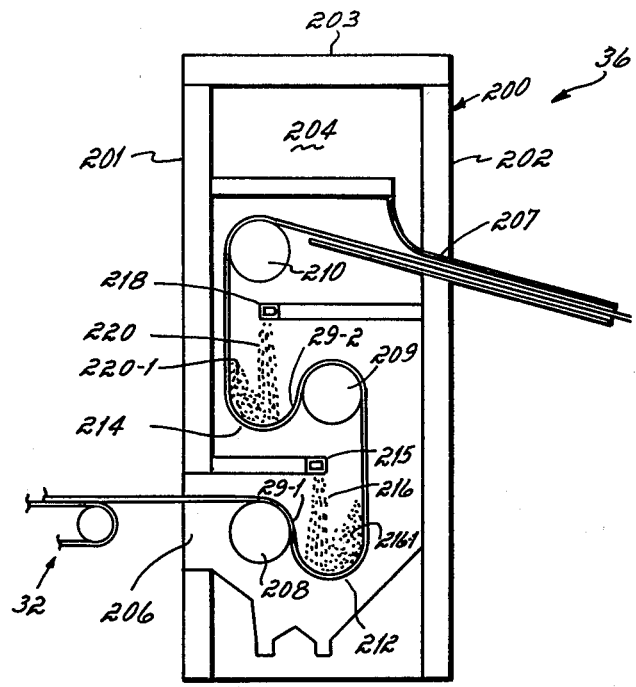
FIG. 10 is a side elevational view of the release powder applicator section which applies a release powder to opposite sides of the composite sheet.

FIG. 15 is a machine timing chart showing the duration of activation of the feed-out conveyors 60 and 70, cutter 14, transfer head 20, composite sheet conveyor 32, and lap press 30.

The apparatus of this invention is designed to form an indefinite length sheet of predetermined width, for example, 40 feet, from an indefinite sheet of much smaller width, e.g., four feet. A 40 foot wide roll of composite sheet material is extremely convenient and useful in providing barrier layers of sheeting material on very large surfaces such as the roof of a large building. The time required to cover a large roof with barrier sheeting material of relatively narrow width, e.g., four feet, is many times that required to cover the same roof with barrier sheeting of large width formed by the apparatus and method of this invention.

With reference to the plan view of the apparatus of this invention shown in FIG. 1, the apparatus is seen to include a supply station 10 which supplies indefinite length stock of known width W. The supply station 10 feeds out a predetermined length L of sheet stock in the direction of arrow 12a to a feed-out section 12 which includes a feed out conveyor belt supported on a feed out table. Located at the input, or upstream, end of the feed-out section 12 is a sheet stock cutter 14 which cuts transversely across the fed-out sheet stock when a length L has been fed therepast to the feed-out section for the purpose of providing a cut sheet 11 of length L and width W. Located upstream of the feed-out section 12 is an adhesive applicator section 16 which applies adhesive to the marginal edge region of the upper surface of the sheet stock as it is fed through the adhesive application section.

Disposed laterally of the feed-out section 12 is a cut-sheet transfer and overlap section 18. The cut-sheet transfer and overlap section 18 includes an elongated cut sheet transfer mechanism 20 which transfers a cut sheet 11 from atop the feed-out conveyor of the feed-out section 12 laterally to an overlap station 33 to overlap the leading edge 22 thereof with the adhesive-bearing trailing edge 24 of the composite sheet 29 to form a lap joint 26 therebetween. The cut sheet transfer mechanism 20 shifts between a pickup position 25 overlying the leading edge 22 of the cut sheet in the feed-out section 12 and a deposit position 27 overlying the adhesive-bearing marginal edge region of the trailing edge 24 of the immediately preceding transferred and overlapped sheet 28.

Disposed downstream of the deposit/overlap station 33 of the transfer mechanism 20 is a lap joint press 30. The lap joint press 30 overlies the composite sheet 29 and when activated moves downwardly to apply force to an underlying lap joint formed previously at the deposit/overlap position 27 which has now been advanced to the press station by a conveyor 32 which underlies the composite sheet 29. Preferably, the press station 30 is located downstream of the deposit/overlap station 33 a distance equivalent to at least two cut sheets 28 and 31. This allows a lap joint 26 located between deposit/overlap position 33 and the lap press 30 to be visually examined in the course of moving downstream from the deposit/overlap position 33 to the press station 30, and if necessary the conveyor 32 stopped and the lap joint 26 corrected before the lap joint 26 reaches the pressing station and is permanently bonded by the lap press 30.

A release powder applicator 36 is located downstream of the press station 30. The release powder applicator 36 applies powder to both the upper and lower surfaces of the composite sheet 29 to prevent it from sticking to itself (a) when stored with adjacent portions thereof in physical contact, such as, when stored in roll form, and/or (b) when cured in rolled form. A storage or take-up station 40 is located downstream of the release powder applicator 36. The storage/take-up station includes a rotatable take-up roll onto which the composite sheet is rolled for storage purposes. Located between the storage/take-up station 40 and the release powder applicator 36 is a sheet tensioner 38 which maintains proper tension in the composite sheet upstream of the take-up roll at the storage/take-up station 40. An edge trimmer section 39 is located immediately adjacent opposite edges of the composite sheet 29 upstream of the storage/take-up section 40 for trimming the composite sheet 29 to the desired width which may be less than length L of sheet 11.

Significantly, as soon as the desired length L of sheet stock is fed out to the feed-out section 12 and cut by the sheet stock cutter 14, it is transferred laterally by the cut sheet transfer mechanism 20 to overlap the trailing edge 24 of the composite sheet 29. As a consequence, at any given time the feed-out section 12 stores a maximum of one cut sheet 11. This is extremely important in this invention where the cut sheets 11 can have a length L of 40 feet or more. Were the cut sheet 11 not to be immediately transferred and overlapped with the trailing edge 24 of the composite sheet 29 following each stock sheet cutting operation by cutter 14, the feed-out section 12 would have to store plural cut sheets. Since, as indicated, the length L of the cut sheets can be 40 feet or more, were it necessary to have a feed-out section capable of storing plural cut sheets, the feed-out section would be at least twice the length of a single cut sheet, i.e., 80 feet or more.

Another important aspect of this invention inheres in the fact that the lap press 30 is located downstream of the deposit/overlap position 27 where the leading edge 22 of a cut sheet being transferred by mechanism 20 is overlapped with the trailing edge 24 of the composite sheet 29. By so locating the lap press 30, the lap press can apply pressure to the underlying lap joint advanced thereto by the conveyor 32 for an interval equal to (a) the length of time required for the transfer mechanism 20 to move from deposit/overlap position 27 to the pick-up position 25 whereat the leading edge 22 of a cut sheet 11 is engaged and move the cut sheet from the pick-up point 25 to the deposit/overlap point 27 whereat the lap joint 26 is formed less (b) the time required for the conveyor 32 to advance the composite sheet sufficiently to position the next lap joint at the press station (distance W less the amount of overlap X). The presence at the press station 30 of a lap joint 26 for a protracted interval enhances the permanency of the lap joint as a result of the pressing operation. Additionally, it permits a reduction in pressure and/or temperature of the lap press 30 over that which would be necessary were the lap press interval to be shortened. A reduction in pressure and/or temperature of the lap press 30 minimizes the likelihood of damage to the lap joint 26 from excess pressure and/or thermal degradation of the sheet material.

A defect removal section 42 is located between the supply station 10 and the adhesive application section 16. The defect removal section 42 permits a defective section of sheet stock to be removed and an appropriate splice made between the remaining material upstream and downstream of the removed defect prior to feeding out and cutting a section of length L corresponding to the width of the composite sheet 29. Removal of a defect in the stock prior to cutting it at station 14 and lapping it to form the composite sheet 29 is far less wasteful in terms of time and material than removing a defect from a cut sheet once it has been lapped to form the composite sheet 29.

Following reeling of the composite sheet 29 on a roll at the storage/reeling station 40, the roll is transported for curing in a suitable oven. Since curing methods and ovens for curing synthetic rubber are well known, a further description thereof is unnecessary.

If desired, curing of the composite sheet 29 can be performed in continuous fashion prior to storing on a roll at the storage/take-up station 40 by passing the composite sheet 29 through a curing oven located between the pressing station 30 and the storage/take-up station 40. The continuous composite sheet curing oven could take a variety of forms and could, for example, be constructed to utilize microwave heating, infrared heating, passage in thermal contact with suitably heated rolls, and the like.

With reference to FIG. 2b, the supply station 10 is seen to include two separate supply rolls 52 and 54, each containing sheet stock material 52a and 54a, respectively, of indefinite length and width W wound on horizontal parallel mandrels 52b and 54b, respectively. The mandrels 52b and 54b are suitably journaled for rotation about their respective horizontal axes on supports 52c, 52c and 54c, 54c. As shown in FIG. 2b, at any given time, one of the supply rolls, e.g., roll 52, is a standby roll, while the other roll, e.g., roll 54, is in use with material being fed out therefrom over suitably positioned horizontal guide rolls. Guide rolls 54e and 54f suitably supported for rotation about their longitudinal axes cooperate with supply roll 54, while guide rolls 52e and 52f suitably supported for rotation about their longitudinal axes cooperate with supply roll 52. The indefinite length sheet stock of width W from one or the other of the supply rolls 52 or 54 passes over a horizontal array of transverse guide rolls 56 suitably supported for rotation about their respective longitudinal axes.

A horizontal tension toll 58 disposed transversely above and in rolling contact with the sheet stock S provided by the supply station 10 is provided to maintain the desired degree of tension in the sheet stock S as it enters the defect removal station 42. The tension roll 58, which has a length slightly in excess of the width W of the sheet stock S, for example, a length slightly in excess of four feet, can be constructed in any of a variety of well known forms for maintaining tension in a relatively short width indefinite length sheet. The roll 58 moves upwardly and downwardly as indicated by arrows 58a and 58b as necessary to maintain tension in the stock S at the desired level for, notwithstanding mismatch between feed speeds for the stock, (a) leaving the supply roll 52 or 54 of section 10 and (b) entering the defect removal station 42.

Assuming the sheet stock S is being supplied from roll 54, when the roll 54 is empty the apparatus is stopped and the tail end 54g of the stock S from roll 54 is located in the phantom line position shown in FIG. 2b leftwardly, or rearwardly, of the guide roll 54e. With the tail end 54g in the position shown, a splice is made to the leading end 52g of the sheet stock from the full roll 52. The splice can be accomplished in any suitable manner, such as, by applying adhesive to at least one of the confronting faces of the sheet stock ends 52g and 54g and thereafter pressing them together to form a lap joint. With the tail end 54g of the empty roll spliced to the beginning 52g of the fresh roll 52, the machine is again started and the supply of sheet stock S from the supply station 10 is resumed. Thereafter, the empty mandrel 54b is removed and a fresh roll substituted in its place. When the roll 52 is empty the machine is again stopped, the tail end of roll 52 is spliced to the leading end of the fresh roll now positioned at 54, and supply of sheet stock S is resumed. The empty mandrel at 52 is then removed and a fresh roll substituted in its place. In this manner, the interruption in operation of the apparatus due to changeover at the supply station 10 from one roll to another is minimized.

The sheet stock S, in accordance with a preferred form of the invention, is uncured synthetic rubber having a thickness of 1/16 inch, 3/32 inch, or ⅛ inch. Since the sheet stock S will be used principally for waterproofing purposes, the sheet stock S is preferably a synthetic EPDM (ethylene-propylene-diene terpolymer) elastomer rubber which is dense, highly inert, and uneffected by moisture, concrete, soil, acids, or bacteria, and has the following physical properties:

| PROPERTY | TEST METHOD | SPECIFICATIONS |
| --- | --- | --- |
| Color | | Grey/Black |
| Specific Gravity | ASTM D-297-72A | 1.18 ± .03 |
| Tensile Strength | ASTM D-412-68 | 1400 psi min. |
| Elongation | ASTM D-412-68 | 300% min. |
| Tear Resistance, Die C | ASTM D-624-73 | 125 lb./in.min. |
| Shore A Hardness (5 second reading) | ASTM D-2240-75 | 60 ± 10 |
| Ozone Resistance | ASTM D-1149-64 7 days/100 pphm/ 100° F./50% Ext. | No Cracks |
| Heat Aging (Accelerated) | ASTM D-573-72 7 days/240° F. | Ten. Min. 1200 psi Elog. Min. 210% |
| Low Temp. Flexibility | ASTM D-746-73 | −75° F. |
| Permeability, perm-mils | ASTM E 96.66 Process B + BW | 2.0 |

In addition to synthetic EPDM elastomer rubber, other synthetic rubbers can be used, such as, butyl or neoprene.

The defect removal section 42 facilitates removal of a defective portion of the stock S fed from the supply station 10 before the stock S is fed to the adhesive applicator section 16 and thence to the sheet stock cutter 14 and the feed-out section 12. The defect removal section 42 includes an endless conveyor belt 60 having a width which is at least coextensive, and preferably wider than the width W of the stock S. The belt 60 guides over the horizontal rollers 60a–60i shown in side elevation in FIG. 2b. A suitable motor (not shown) drives at least one of the rollers 60a–60i to move the upper horizontal runs 60' and 60'' of the belt 60 between rollers 60a and 60i, and between rollers 60f and 60g, in the direction of arrow 60k.

Located above the guide roll 60h and in the same horizontal plane as the upper conveyor runs 60' and 60'' is a horizontal elongated stock severing platen 62 which is disposed transversely of the feed direction 60k of the stock S. The stock severing platen 62 can be fabricated of steel or other suitable hard material and is provided with a central notch 62a which extends from one end of the stock severing platen to the other transverse to the stock feed direction 60k. The notch 62a cooperates with a rotary cutting wheel or knife edge 62b for severing the stock S, for reasons to become more apparent hereinafter in connection with the defect removal sequence shown in FIGS. 3a–3e. The rotary cutter or knife blade may, if desired, be fastened to one end of a pole which is manipulated by an operator. When it is desired to sever the stock S at a point overlying notch 62a, the conveyor belt 60 and a second downstream conveyor belt 70 to be described hereafter are stopped, terminating transport motion of the stock S in the direction of arrow 60k. With the stock S stationary, the rotary cutting element or knife secured to the end of the operator-held pole is positioned on the upper surface of the sheet stock S immediately above the notch 62a. With the cutting element so positioned, the cutting element is urged downwardly by operator manipulation of the pole to which the cutting element is mounted, causing the sheet stock S overlying the notch 62a, which is sandwiched between the stationary platen 62 and the downwardly urged cutting element, to be severed or cut. The cutting element, while depressed downwardly by the operator, is moved transversely of the stock S along line 62' (FIG. 2a), severing the sheet stock S along its entire width at a point overlying notch 62a.

A second cutting platen 64, also horizontally disposed transversely of the stock S, is located between the downstream end of the conveyor belt run 60'' and the upstream conveyor run 70' of the conveyor 70 to be described in more detail hereafter. The platen 64, like the platen 62, is provided with a notch (not shown) analogous to notch 62a (FIG. 2c) which runs the entire length of the platen in alignment with the phantom line 64' (FIG. 2a). The platen 64, also like the platen 62, is disposed generally in the same horizontal plane as the conveyor run 60'' and the conveyor run 70'. The sheet stock S can be cut along phantom line 64' by stopping the conveyors 60 and 70, and with a suitable cutting element urging the sheet stock S against the notch (not shown) in the platen 64 and while doing so, moving the cutting element transversely across the sheet stock S parallel to phantom line 64' (FIG. 2a).

With reference to FIGS. 3a–3e the defect removal sequence will now be described. Specifically, when a defect is observed in the sheet stock S, which can most conveniently be observed as the sheet stock S is being transported between upper rightmost guide roll 56 and the lower guide roll 57, the conveyors 60 and 70 are permitted to run, transporting the stock in the direction of arrow 60k until such time as the beginning of the defect which is indicated by the asterisk in FIG. 3a arrives slightly upstream (leftwardly) of the platen 64. At this point, the conveyors 60 and 70 are stopped and the stock sheet S is severed parallel to phantom line 64' (FIG. 2a) by urging a suitable cutting element (shown schematically in FIG. 3a with the reference numeral 64b) downwardly into the notch 64a and while so engaged traversing it along the length of the notch to sever the stock parallel to phantom line 64' (FIG. 2a).

With the sheet stock S severed slightly downstream of the defect, the conveyor belt 60 is started while conveyor or belt 70 remains stopped, and the stock S begins to move in the direction of arrow 60k as shown in FIG. 3b, causing the defective material, indicated by the reference letter D in FIG. 3b, to accumulate on the conveyor run 60'' between the sheet severing platens 64 and 62. When all of the defective material is downstream (rightwardly) of the severing platen 62, the conveyor 60 is stopped. The sheet stock S is then severed across its entire width by urging a cutting element (shown schematically in FIG. 3c with the reference numeral 62b) downwardly against the stock into the notch 62a of the platen 62. The cutting element 62b, while urged downwardly, is moved across the sheet to sever the stock along phantom line 62' immediately upstream (leftwardly) of the defective material D. At this point, the stock S has been cut upstream and downstream of the defective material D by the cutters 64b and 62b and both conveyors 60 and 70 are stopped.

The conveyor 60 is now started while conveyor 70 remains stopped to move the leading edge 68 of the stock S being fed from the supply station 10 downwardly in the direction of arrow 60k toward the trailing edge 69 of the sheet stock S which is stationary on stopped conveyor 70, as shown in FIG. 3d. The conveyor 60 is permitted to run until the leading and trailing edges 68 and 69 of the stock overlap, as shown in FIG. 3e. At this point, the conveyor 60 is stopped, a suitable adhesive is applied to at least one of the confronting surfaces of the stock S in the region of the leading and trailing edges 68 and 69, and the overlapped leading and trailing edge portions urged together to form a lap joint. With the sheet stock S now spliced the conveyors 60 and 70 are started and run in synchronism to advance the stock S, with the defect removed, through the adhesive application station 16, sheet stock cutter 14, and on to the feed-out conveyor of the feed-out section 12.

If desired, the sheet stock severing operation at platen 62 and platen 64 can be accomplished with machine-operated cutting elements, rather than manually-operated cutting elements, of the general type shown in U.S. Pat. Nos. 3,181,405 and 2,962,083.

The stock conveyor 70, collectively comprising endless belts 70-1, 70-2, 70-3, 70-4, 70-5 . . . 70-n train over a plurality of horizontal, transversely disposed, rolls 70a–70n mounted for rotation about their respective axes. As many of rolls 70a–70n as are necessary are driven to move the feed stock supported on the upper run 70' in the direction of arrow 12a.

The adhesive application section 16, which is shown in more detail in FIGS. 4a, 4b, and 4c, comprises an adhesive spreader 81 and an air-bearing unit 125. The adhesive spreader 81 includes an adhesive applicator 80 which applies one or more beads of adhesive to the upper surface of the sheet stock S as it is moved by conveyor 70 in the direction of arrow 12a beneath the output nozzle 80' (FIG. 4b) of the adhesive applicator.

The adhesive applicator 80 forms no part of this invention and, accordingly, is not further described. Any commercially available adhesive applicator, such as available from Standard Knapp, Inc., Portland, Conn., Part No. 455B50405, can be utilized. The adhesive applicator 80 is provided with a suitable selectively operable valve to terminate flow of the adhesive from nozzle 80' when the conveyor 80 is stopped to avoid undesired accumulations of adhesive on the stock. The control valve also prevents adhesive from being dispensed from the nozzle 80' when no sheet stock is present on the conveyor 70, whether or not the conveyor 70 is actually in operation.

Disposed downstream of the adhesive applicator 80 are a plurality of short, transversely disposed, horizontal rollers 82, 84, and 86 which, when the conveyor is running with adhesive bead-bearing sheet stock transported thereon, are urged downwardly in rolling contact with the marginal region of the stock to which the adhesive has been previously applied. The transversely disposed rolls 82, 84, and 86 when in rolling contact with the sheet stock thereunder, are effective to spread or distribute the bead of adhesive dispensed from nozzle 80' and convert it to a longitudinal band of adhesive of predetermined width, e.g., four inches, corresponding to the desired dimension X of the lap joint 26 (FIG. 1).

To bias the rollers 82, 84, and 86 against the adhesive-bearing sheet S, compression springs 82b, 84b, and 86b are provided between the links 82a, 84a, and 86a and stationary supports, as shown schematically in FIG. 4b. It will be understood that the bias springs for the rollers 82, 84, and 86 may take other forms, such as, torsion springs wrapped around shafts 82', 84', and 86' which pivotally mount links 82a, 84a, and 86a to vertical frame 88.

When the conveyor 70 is stopped, such as to remove a defect in the stock at the defect removal station 42, in a manner previously described, it is desirable to elevate the adhesive bead-spreading rolls 82, 84, and 86 upwardly out of contact with the adhesive-bearing upper surface of the stock. In this way the adhesive-spreading rolls 82, 84, and 86 will not adhere to the underlying adhesive-bearing sheet stock during the time necessary to remove a defect at section 42 when the stock conveyor 70 is stationary.

To facilitate elevation of the rolls 82, 84, and 86, the rolls are mounted on horizontal shafts 82', 84', and 86' which are rotatably mounted at one end to the lower ends of links 82a, 84a, and 86a, respectively. The links 82a, 84a, and 86a at their respective upper ends are pivotally connected at 82'', 84'', and 86'' to a vertical stationary plate 88 disposed perpendicularly to shafts 82', 84', and 86'. An elongated rigid bar 90 is mounted for bidirectional, horizontal, longitudinal reciprocation parallel to its longitudinal axis and parallel to the plate 88 by a pair of guide blocks 94 and 96 secured to the plate 88. The downstream end (rightward end as viewed in FIG. 4c) of the bar 90 is provided with a right angle tab 90a which is fastened to the end of a piston rod 98 connected to a piston 100 which is bidirectionally driven in a cylinder 102 stationarily secured to the downstream end of the plate 88.

The bar 90, which as indicated moves bidirectionally in the direction of double-headed arrow 92, has fastened to it three cam rollers 90b which are free to rotate about horizontal axes perpendicular to the plate 88. The cam rolls 90b are mounted on shafts secured to the vertical surface of the bar 90 adjacent to the plate 88, the shafts extending through suitably provided horizontal slots 88a, 88b, and 88c provided in the plate 88. The cam rolls 90b underlie the lower edge of the links 82a, 84a, and 86a which at their lower ends mount the adhesive-spreading rolls 82, 84, and 86.

Normally, the bar 90 is in the position shown in FIG. 4c. In this position the cam rolls 90b mounted on the bar 90 are in the position shown, allowing the links 82a, 84a, and 86a to be in their lowermost position, placing adhesive-spreading rollers 82, 84, and 86 in rolling contact with the upper surface of the stock passing through the adhesive spreader on transverse guide rolls 108a, 108b, 108c, and 108d suitably journaled at their opposite ends for rotation about their longitudinal axes.

When it is desired to raise the adhesive-spreading rollers 82, 84, and 86 upwardly out of contact with the underlying sheet stock, air is introduced into the cylinder 102 leftwardly (FIG. 4c) of the piston 100. This causes the piston rod 98 to move downstream (rightwardly) which in turn translates the bar 92 and the cam rolls 90b secured thereto in a rightwardly direction. As the cam rolls 90b translate rightwardly, as viewed in FIG. 4c, the links 82a, 84a, and 86a pivot counterclockwise about their pivot mount elements 82'', 84'', and 86'' moving the rolls 82, 84, and 86 upwardly.

When it is desired to return the adhesive-spreading rollers 82, 84, and 86 to their lowermost position shown in FIG. 4c, air is introduced into the cylinder 102 rightwardly of the piston 100 which drives the piston rod 98, and in turn the bar 90, leftwardly. As the bar 90 moves leftwardly the cam rolls 90b carried thereby move leftwardly allowing the links 82a, 84a, and 86a to pivot clockwise about their pivot mounts 82'', 84'', and 86'' which in turn lowers the rolls 82, 84, and 86.

The plate 88 is mounted to a U-shaped structural member 110 which has depending legs 111 and 112 which mount circumferentially grooved wheels 113 and 114 on shafts 115 and 116. A pair of rails 117 and 117a are disposed transverse to the direction of movement of the sheet stock by conveyor 70. One rail 117 is configured to engage the circumferentially grooved wheel 113 and hence facilitates transverse movement of the adhesive applicator 80 and the rollers 82, 84, and 86 relative to the conveyor 70. In this way the rolls 82, 84, and 86 can be placed at the desired point relative to the edge of the sheet stock passing through the adhesive application section 16 to accommodate sheets of varying width W. To hold the wheels 113 and 114 against rails 117 and 117a, the rails are mounted on transverse angle irons 118 and 119 which are stationarily mounted to a suitable frame or the like. Rollers 120 and 121 secured to the lower ends of the depending legs 111 and 112 engage the lower surface of the horizontal portions of the angle irons 118 and 119, limiting upward movement of the legs 111 and 112.

Preferably, the entire adhesive applicating section, including adhesive dispenser 80 and spreader 81, which is mounted to frame 110, moves automatically transversely to the feed out direction 12a on rails 116 and 117 to track the edge of the sheet stock S as it wanders transversely to its direction of feed 12a. To accomplish automatic tracking, a fluidic actuator consisting of a stationary cylinder 104 and a bidirectionally movable piston 104a having an angled piston rod 104b connected to frame 110 is provided. The position of the edge of the sheet stock is sensed and the piston 104a moved in or out parallel to tracks 116 and 117 as necessary to maintain adhesive applicator section at the desired position relative to the wandering sheet stock edge. An automatic tracking control unit including edge sensor and fluidic control for cylinder 104 is commercially available from Fife Corporation, Oklahoma City, Okla., designated Fife Edge-Guide System P-25.

With reference to FIGS. 4a and 4b an air-bearing unit 125 is provided downstream of the adhesive spreader 81. The air-bearing unit 125 includes a perforated plate 126 of generally rectangular shape which is disposed in a horizontal plane flush with the upper run of conveyor belts 70-1, . . . 70-n which collectively constitute the upper run 70' of the conveyor 70. The downstream end of conveyor belts 70-1 and 70-2 are spaced apart from the upstream end of conveyor belts 70-3 and 70-4 to permit placement of the adhesive spreader 81 and the air-bearing unit 125. The air-bearing unit 125 also includes a plenum chamber 128 which at its upper end is sealed by the plate 126. The floor of the plenum chamber 128 communicates with a pressurized air inlet conduit 130 which is connected to a suitable source of pressurized air such as an air pump (not shown). The air-bearing unit 125 directs air jets through perforations in the plate 126 in an upwardly direction as shown by the arrows 134. The air jets 134 apply upward lifting force to the bottom surface of the sheet stock S located below the marginal portion of the sheet stock S bearing the spread adhesive. The upward forces on the sheet stock S passing over the air-bearing unit 125 created by the jets 134 lift the overlying marginal edge region of the stock S above the surface of the plate 126, effectively floating the adhesive-bearing marginal edge portion of the sheet stock S passing thereover on a cushion of air. This prevents the adhesive-bearing sheet stock which otherwise would slide on plate 126 from riding on the plate, or in its absence a conveyor belt, and possibly putting adhesive thereon.

The sheet stock cutter 14 functions to sever from the stock S supplied by the supply station 10 a cut sheet of length L which will be lapped with similar previously cut sheets to form the composite sheet 29 in a manner to be described in more detail hereafter. The sheet stock cutter 14, as shown in FIG. 4d, includes a platen 140 disposed horizontally and transversely to the direction of travel 12a of the stock S on the conveyor 70. The platen 140 is constructed substantially identically to the platens 62 and 64, essentially providing a back-up plate for a transversely moving cutting element which cuts the stock after a length L has been fed out and is positioned on the conveyor of the feed-out section 12. Preferably, the cutter element utilized at sheet stock cutter 14 is machine-operated under automatic control. In accordance with one form of sheet stock cutter, a rotary cutting element 142 rotatably mounted on a pin 144 between depending legs of a yoke 146 is provided. The yoke 146 is mounted via a block 146a for reciprocating movement on a pair of horizontal, spaced-apart, parallel guide rods 148, 150 stationarily mounted at their opposite ends in brackets 152 and 153 located on either side of the path of travel of the sheet stock through the sheet stock cutter 14. The guide rods 148, 150 pass through suitably provided guide bushings formed in the yoke 146. The yoke 146, and hence the rotary cutting element 142, is reciprocated between positions on either side of the sheet stock by an endless chain 154 which passes over an idler sprocket 156 mounted to the bracket 153 and a drive sprocket 158 extending from a drive motor 157 mounted to the bracket 152. The motor 157 is preferably selectively bidirectionally driveable to reciprocate the yoke 146 and hence the cutting element 142 between its opposite limits of travel. The upper portion of the yoke 146 engages the lower run of the chain 154 to impart reciprocating movement to the yoke 146 and hence the cutting element 142 when the motor bidirectionally drives the chain.

As the cutting element 142 moves transversely of the sheet stock underlying it under the action of the motor driven chain 154, the rotary cutting element urges the sheet stock S forcibly against the platen 140, transversely cutting the sheet stock. Preferably during cutting, the sheet stock is stationary by reason of stopping the conveyor 70 when the rotary cutting element 142 traverses the platen 140 to cut the sheet stock sandwiched therebetween. To automatically stop the sheet feed action of the conveyors 60 and 70 when a predetermined length L of stock from the supply station 10 is located on the feed-out conveyor 70 of the feed-out section 12 downstream of the cutter 14, an optical sensor 159 is provided at the downstream end of the feed-out section 12, as shown in FIG. 1. The optical sensor 159 is located slightly above the conveyor 70 of the feed-out section 12 at a point a distance L downstream of the cutter 14. The optical sensor 159 senses the leading edge 11a of the stock S and in response thereto provides an electrical signal which stops both the sheet conveyor 60 and the sheet conveyor 70 as well as activates the cutter drive motor 157 to drive the cutting element 142 transversely across the sheet to sever from the indefinite length sheet stock S a cut sheet 11 of length L.

The optical sensor 159 can be of the light transmission or light reflectance type. For example, if the optical sensor 159 is of the light reflectance type, a source of light is directed against a reflecting surface and the light beam reflected upwardly to a light sensing element located proximate the light source. Upon arrival of the leading edge 11a of the stock sheet the leading edge is interposed between the light source/light sensor and the reflecting element, causing a reduced amount of light to be reflected back to the light sensor by the stock sheet which typically is a poor light reflector. Reduction in reflected light generates, after suitable amplification, an electrical control signal for terminating operation of the conveyors 60 and 70 and for actuating the cutter 14.

As shown in FIGS. 1, 2a, 2b, and 5, the transfer mechanism 20, which transfers a cut sheet 11 of length L from the feed-out conveyor 70 of feed-out section 12 laterally to partially overlap the trailing edge 24 and form a lap joint 26 for the composite sheet 29, includes an elongated horizontal cut sheet transfer head 20' disposed parallel to the sheet stock feed-out direction 12a with its bottom surface 20a thereof spaced approximately one inch above the upper conveyor run 70" of the feedout conveyor 70. The cut sheet transfer head 20' preferably has a length slightly in excess of the maximum length L of the cut sheet which forms the composite sheet 29. The cut sheet transfer head 20' reciprocates bidirectionally in the direction of arrow 17 in a horizontal plane between the pickup station 25 wherein the cut sheet transfer head overlies the leading edge 22 of a cut sheet 11 located at the feed-out section 12 and a deposit/overlap station 27 whereat the cut sheet transfer head overlies the adhesive-bearing trailing edge 24 of the last cut sheet 28 connected via a lap joint 26 to the composite sheet 29. Supporting the transfer head 20 for reciprocating motion between the pickup station 25 and the deposit/overlap station 27 in a horizontal plane are a pair of spaced-apart, parallel, horizontally disposed guide rails 151a and 151b which are stationarily mounted on a suitable support 151c. A suitably disposed chain drive (not shown) operated by a bidirectional motor (not shown) reciprocates the transfer head 20' bidirectionally parallel to the arrow 17 between the pickup station 25 and the deposit/overlap point 27, as desired.

The transfer head 20', in a preferred form, includes a hollow elongated plenum of generally rectangular cross-section having a perforated lower surface 20a, an upper wall 20b, and opposite side walls 20c and 20d, as shown in FIG. 5b. The hollow transfer head 20' is sealed at its opposite ends by suitable vertical closure plates. A source of vacuum is connected to a conduit 20e connected to the interior 20f of the transfer head plenum via a suitable opening provided in the upper wall 20b. A valve is connected in vacuum line 20e to facilitate selective application of vacuum to the plenum chamber 20f of the transfer head 20.

When vacuum is applied to the plenum chamber 20f via vacuum line 20e when the transfer head is located at the pickup station 25 disposed in overlying relationship to the leading edge 22 of a freshly cut sheet 11 at the feed-out station 12 with its bottom surface 20a located slightly above the leading edge 22 of the freshly cut sheet, the leading edge 22 of the freshly cut sheet is lifted upwardly into contact with the perforated bottom surface 20a, effectively gripping by vacuum force the leading edge of the freshly cut sheet. As the transfer head 20 moves from the pickup station 25 to the deposit/overlap point 27, the freshly cut sheet 11 is dragged laterally in the direction of arrow 17a from the feed-out section 12 to a position such that the leading edge 22 slightly overlaps by a distance X the trailing edge 24 of the last cut sheet 28 of the composite sheet 29. With the leading edge 22 slightly overlapping the trailing edge 24, the vacuum in line 20e is terminated, allowing the leading edge 22 to drift downwardly under the force of gravity to the underlying adhesive-bearing trailing edge 24 of the last cut sheet 28 of the composite sheet 29. Thus, termination of the vacuum in line 20e causes the leading edge of the sheet 22 to float downwardly under its own weight when released from grasp by the vacuum surface 20a of the transfer head 20'.

By reason of the fact that the perforated surface 20a of the transfer head 20' against which the leading edge of a cut sheet is gripped in the course of being transported from the pickup station 25 to the deposit/overlap point 27 is spaced above the upper run 70" of the conveyor 70, the bottom surface 20a of the transfer head does not apply a downward compressive force against the leading edge 22 of a sheet being picked up at the pickup station 25, thereby avoiding any possibility of damaging the leading edge of the sheet during the process of being gripped by the transfer head. Additionally, and also by reason of the fact that the lower surface 20a of the transfer head 20 is spaced appreciably above the upper run of the transverse conveyor 32, when the cut sheet is being delivered to the deposit/overlap point by the transfer head, compressive forces are not applied to either the leading edge 22 of the sheet gripped by the transfer head or the trailing edge 24 of the last sheet 28 of the composite sheet 29.

To accurately position the transfer head 20' properly with respect to the leading edge 22 of a sheet 11 at the feed-out section 12 prior to sheet pick-up, as well as properly position the transfer head with respect to the leading edge 24 at the deposit/overlap point 27 prior to release of the leading edge 22 of a transferred sheet, a series of optical sheet edge sensors are provided on the transfer head 20'. Specifically, and with reference to FIG. 5b, four optical sensors 160, 161, 162, and 163 are secured to the transfer head 20'. Optical sensor 163, which is located several inches downstream (rightwardly) of plenum chamber wall 20d of the transfer head 20', senses approach of the transfer head to the trailing edge 24 of the last sheet 28 of the composite sheet 29 as the transfer head, is moving in the direction of arrow 17a, approaching the deposit/overlap point 27. The signal generated by the optical sensor 163 upon sensing the trailing edge 24 of the sheet 28 is utilized to slow down the rate of travel of the transfer head 20' in the downstream direction.

The optical sensor 162 mounted to transfer head 20' proximate plenum chamber wall 20d senses arrival of the downstream plenum wall 20d over the leading edge 22 of the last cut sheet 28 of the composite sheet 29 as the transfer head moves in the direction of arrow 17a. In response to the output provided by the optical sensor 162, the transfer head 20' travels further a predetermined distance X in the direction of arrow 17a, whereupon the transfer head stops and the vacuum in line 20e is terminated, to release the leading edge of the cut sheet being transferred, and provide the desired degree of overlap X to form the lap joint 26 at the deposit/overlap point 27.

The additional distance X travelled subsequent to sensing the trailing edge 24 with the optical sensor 162, but prior to terminating movement of the transfer head 20, can be derived using a counter responsive to the pulse output of a conventional tachometer associated with the rotating motor drive which operates the transfer head 20'. For example, if the distance X corresponding to the desired overlap is five inches and the tachometer associated with the rotary drive for the head 20' provides one output pulse for every linear inch of travel of the head 20', the counter would accumulate a count of five whereupon an output would be produced to terminate movement of the head. Since the counter only starts counting when an output is produced by optical sensor 162 at the point when the vacuum plenum wall 20d overlies the trailing edge 24 of the last sheet 28 of the composite sheet 29, a count of five will only be accumulated in the counter responsive to the tachometer pulses when the head has travelled five inches downstream beyond trailing edge 24 corresponding the desired overlap distance X.

The optical sensor 160 mounted to the left wall 20c of the plenum chamber 20f of the transfer head 20 senses, as the head 20 moves upstream in the direction of arrow 17b, alignment of the upstream plenum chamber wall 20c with the leading edge 22 of a freshly cut sheet 11 at the feed-out section 12. The output from the optical sensor 160 is utilized to slow down the rate of travel of the transfer head 20 in the upstream direction 17b as it is moving to the pickup station 25 to engage the leading edge 22 of a freshly cut sheet 11. The optical sensor 161 mounted to the plenum chamber wall 20d provides an electrical output signal when the plenum wall 20d is aligned with the leading edge 22 of the sheet 11 at the feed-out section 12 as the head moves in the direction of arrow 17b. In response to the signal produced by the optical sensor 161, the motor drive for the transfer head 20' is terminated to stop the transfer head with the leading edge 22 aligned with wall 20d of the plenum chamber 20f of the transfer head 20. At this point, the leading edge marginal region of the freshly cut sheet 11 at the feed-out section 12 underlies the perforated surface 20a of the transfer head 20 such that when vacuum is applied to the line 20e, the leading edge region will be elevated and gripped by the transfer head preparatory to moving the transfer head downstream in the direction of arrow 17a to the deposit/overlap point where the leading edge 22 is overlapped with the trailing edge 24 of the last sheet 28.

Sensors 160–163 can be constructed similarly to sensor 159.

With reference to FIGS. 6a–6f, a cut sheet pickup, transfer, and release sequence is described, starting with the transfer head 20' in the pickup position 25 as shown in FIG. 6a. Specifically, when the transfer head 20' has stopped over the leading edge 22 of the sheet 11 at the feed-out section 12, vacuum is applied to the transfer head and the leading edge region of the cut sheet 11 is lifted upwardly against the bottom surface 20a of the transfer head, as shown in FIG. 6b. The transfer head then moves downstream from the pickup station 25 toward the deposit/overlap point 27, as shown in FIG. 6c. Upon arrival of the sensor 163 over the trailing edge 24 of the last sheet 28 of the composite sheet 29, the transfer head begins to slow down. When the optical sensor 162 has reached the previously discussed point overlying the trailing edge 24 of the sheet 28, the transfer head stops and the vacuum is discontinued, releasing the leading edge of the transferred sheet, allowing it to float downwardly atop the trailing edge region 24 of sheet 28 to form the lap joint 26 as shown in FIG. 6d.

Thereafter, the transfer head moves leftwardly, that is, upstream, at its high speed rate until the optical sensor 160 senses the leading edge 22 of the next freshly cut sheet 11', as shown in FIG. 6e, at which time the transfer head slows down. When the sensor 161 is aligned with the leading edge 22' of the next freshly cut sheet 11' at the feed-out section 12, the transfer head 20' stops. At this point, vacuum is applied to the transfer head 20' and the leading edge region 22' of the underlying sheet 11' lifted upwardly into contact with the bottom surface 20a of the transfer head, and the cut sheet transfer process repeated.

Actuation intervals for (a) feed-out conveyors 60 and 70 which feed out a length L of sheet stock S, (b) cutter 14 which severs the stock S to produce a cut sheet 11, (c) transfer head 20 which transfers a freshly cut sheet 11 to the overlap position 27, (d) conveyor 32 which advances the composite sheet 29 to position a lap joint 26 at the lap press 30, and (e) lap press 30 which presses the lap joints, are shown in FIG. 15. As can be seen in FIG. 15, the total cycle time is 0.333 minutes, which is also the cycle time for operation of the transfer head 20. The transfer head 20 initiates its cycle by gripping the leading edge 22 of a freshly cut sheet 11 immediately upon completion of the operation of the cutter 14 which takes 0.03 minutes to sever stock S. The lap joint press operation also starts at this same point in time as the transfer head cycle. Upon completion of lap pressing, which takes 0.192 minutes, the conveyor 32 starts to advance the composite sheet 29 which takes 0.141 minutes to complete. Finally, the feed-out operation, which takes 0.20 minutes starts as soon as the freshly cut sheet 11 has been moved clear of the feed-out section 12 by the transfer head 20.

With more particular reference to FIG. 15, which is a machine cycle chart of the apparatus of this invention, a brief description of the operation and synchronism is described for the stock feed-out conveyors 60 and 70, the cutter 14, the transfer head 20, the lap press 30, and the composite sheet advancing conveyor 32. Assuming the leading edge of the sheet stock is at the cutter 14 and a freshly cut sheet is not at the feed-out station 12, the sheet stock advancing conveyors 60 and 70 are operated in synchronism for 0.200 minutes to advance past the cutter to the feed-out station 12 a length L of sheet stock which, after cutting with the cutter 14, will constitute the "first" freshly cut sheet. After 0.200 minutes of operation of conveyors 60 and 70, the conveyors are stopped and the cutter 14 is actuated for a period of 0.030 minutes to sever the sheet stock and provide the "first" cut sheet of length L at the feed-out station 12.

Upon conclusion of the cutting operation, the transfer head 20 which is located at the pick-up station is actuated to grip the leading edge 22 of the freshly cut "first" sheet and transfer it in the direction of arrow 17a to the deposit station. As soon as the freshly cut "first" sheet clears the feed-out section 12, the machine cycle of 0.333 minutes is completed, and the conveyors 60 and 70, which were stopped for 0.133 minutes to permit cutting of the "first sheet" and lateral transfer by head 20 sufficiently to clear the feed-out section 12, are once again activated, starting the second machine cycle, to feed-out the "second" sheet. During the latter portion of feed-out of the "second" cut sheet by the conveyors 60 and 70, the composite sheet advance conveyor 32 is operated for 0.141 minutes to advance downstream from the deposit station the "first" cut sheet.

At the end of the cutting operation for the "first sheet," in addition to gripping the "first" sheet and transferring it to the deposit station, the lap press 30 goes through a cycle of operation which lasts 0.192 minutes. However, since no lap joint has yet reached the lap press, operation of the lap press is ineffectual.

When the conveyors 60 and 70 have fed out the "second" sheet, the cutter 14 is again operated to sever it from the sheet stock whereupon the transfer head 20 grips it and transfers it to establish a lap joint with the "first" cut sheet, which was advanced downstream by conveyor 32 during feed-out of the "second" sheet. A total cycle of operation of the transfer head 20, from the point of picking up a freshly cut sheet, overlapping it with the prior cut sheet and returning to the pick-up point, takes 0.333 minutes. The lap press also cycles during transfer of the last freshly cut sheet, the "second" sheet, but again is ineffectual since no lap joint is at the lap press station.

The foregoing sequence of operations continues to feed-out, cut, transfer, overlap, and advance in the direction of arrow 17a, the "third" and "fourth" cut sheet. At the conclusion of the cutting of the "fourth" cut sheet, the lap joint between the "first" and "second" cut sheets is at the lap press station such that operation of the lap press is effective to press the lap joint and enhance adhesion of the "first" and "second" cut sheets.

During the time that the transfer head is moving from the deposit/overlap point 27 following release of the leading edge of the sheet to form the overlap 26, and as the transfer head moves downstream from the position shown in FIG. 6d to the position shown in FIGS. 6e and 6f, the conveyor 32 is moving the composite sheet 29 downstream to align a downstream lap joint 26' at the lap pressing station 30 as shown in FIG. 6f. During the time interval that the leading edge 22 of a freshly cut sheet 11 at feed-out station 12 is being gripped by the application of vacuum to the plenum chanber 28 of the transfer head 20' and the gripped freshly cut sheet transported downstream to form the overlap 26 with the trailing edge 24 of the last sheet 28 of the composite sheet 29, the lap joint 26' is being pressed at the lap pressing station 30, as shown in FIGS. 6a, 6b, 6c, and 6d. Thus, during gripping, transport, and release of a freshly cut sheet to form a lap joint 26 with the last sheet 28 of the composite sheet 29, a previously formed lap joint located at pressing station 30 is being pressed. The extended duration press interval which results, permits both the pressing temperature and/or the pressing force to be maintained at minimum levels, thereby avoiding damage to the lap joint occasioned by thermal degradation and/or excessive compressive forces.

As shown in FIGS. 7-9, the lap press 30 includes an elongated structural I-beam 170 having an upper horizontal flange 171, an intermediate vertical web 172, and a bottom horizontal flange 173. The structural I-beam 170 extends across the entire composite sheet 29 in a direction perpendicular to the direction of travel 17 of the composite sheet on the conveyor 32. To provide the desired amount of weight for pressing a lap joint at the lap press station, distributed weight is added to the structural I-beam member 170 by securing to the upper flange 171 an elongated structural channel member 174. The bottom surface 175 of the horizontal flange member 173 of the structural I-beam 170 is generally flat, but is not machined flat. Accordingly, and although the surface 175 is generally flat, there are irregularities in the flatness which are present in any structural I-beam by virtue of the particular manufacturing technique used to produce it.

Extending along the entire bottom of the structural I-beam 173 underlying the lower surface 175 of the flange 173 is a resilient pad 176 fabricated of, for example, foam rubber. Sandwiched between the upper surface of the pad 176 at points corresponding to the spaces 177 between adjacent belts of the conveyor 32, such as between adjacent belts 32-1 and 32-2 (FIG. 9), are thin pads 178. The pads 178 have a thickness and compressibility equal to the thickness of the belts 32-1, 32-2, . . . 32-n which comprise the conveyor 32. The pad 176 which runs the entire length of the flange 173, in combination with the spaced pads 178 which overlie spaces 177 between the various belts of the conveyor 32, provide a uniform lap pressure force along with the length of the flange 173 when the structural I-beam 170 is lowered onto a lap joint 26 to effect a pressing operation. When the structural I-beam 170 is in its lowered position, the amount by which the pad 176 is compressed is relatively uniform along the length of the structural I-beam 170 regardless of whether or not one of the belts 32-1, 32-2, . . . which collectively comprise conveyor 32, underlies the lap joint or a space 177 between adjacent belts underlies the lap joint. Since the thickness and compressibility of the pads 178 is identical to the belt material 32 which underlies the lap joint, the distance Y' between the bottom surface 175 of the flange 173 and the upper surface of the conveyor belt 32-2 is the same as the distance Y" between the bottom surface of the pad 178 and the upper surface of a stationary horizontal flat table 180 which underlies and supports the conveyor belt 32, serving as an anvil for the press. With distance Y' equal to distance Y", it is clear that when the I-beam 170 is lowered into contact with the lap joint 26 and the pad 176 compressed, the pad 176 will be compressed uniformly along its length regardless of whether a belt, such as belt 32-1 or 32-2, underlies the pad or a space 177 between belts underlies the pad.

To minimize adhesion between the upper surface of the lap joint 26 and the bottom surface of the pad 176, following a lap pressing operation when the structural I-beam 170 is being elevated and the pad 176 being raised out of contact with the lap joint 26, a Teflon sheet 181 is provided along the bottom surface of the pad 176. The Teflon sheet is secured at its opposite edges by suitable fasteners 184 to vertical flanges of elongated angle iron brackets 182 and 183 which have their lower flanges welded to the upper surface of the structural I-beam flange 173.

In practice, the vertical travel of the structural I-beam 170 is approximately eight inches between its fully lowered position and its fully raised position. As the structural I-beam moves from its fully lowered position toward its fully raised position, the upper surface of the underlying lap joint 26 will separate from the Teflon sheet 181 after approximately one inch of upward vertical travel of the structural I-beam. The approximately one inch of travel of the structural I-beam 170 in an upward direction when the upper surface of the lap joint 26 is adhering to the Teflon sheet 181 does not seriously dislocate the lap joint. As a consequence, when the lap joint 26 does separate from the Teflon sheet 181, the lap joint 26 drops back down under the force of gravity to a position on the conveyor 32 without producing any noticeable wrinkling of the composite sheet 29 in the region of the lap 26.

To facilitate raising and lowering the structural I-beam 170 in the manner described, stationary supports 185 and 186 are provided on either side of conveyor 32 adjacent the opposite ends of the structural I-beam 170. A pair of guide rolls 185-1 mounted to the support 185 prevent leftward movement of the I-beam 170 as viewed in FIG. 7, while guide rolls 186-1 mounted to the stationary support 186 prevent rightward movement of the I-beam 170. A set of guide rolls 185-2 mounted on the support 185 on the downstream side of the web 172 of the I-beam 170 limit downstream movement of the left end of the I-beam as viewed in FIG. 7. A similar set of guide rolls (not shown) are located opposite guide rolls 185-2 on the other side of the I-beam web 172 to limit upstream movement of the lefthand end of the I-beam. A set of guide rolls 186-2, similar to guide rolls 185-2, are secured to the support 186 for preventing downstream movement of the righthand side of the I-beam. A set of guide rolls (not shown) located opposite guide rolls 186-2 on the other side of the web 170 prevent upstream movement of the I-beam. Thus, the I-beam is precluded from spurious movement.

To elevate the I-beam 170, pneumatic actuators 188 and 189 are provided at each end of the lap press 30. The pneumatic actuator 188 includes a piston 188a which reciprocates vertically in a cylinder 188b. A piston rod 188c connects at its upper end to the bottom flange of the I-beam. The cylinder is supported at the desired vertical height by a stationary support 192. An elevating force is applied to the righthand end of the I-beam 170 by admitting pressurized fluid to the bottom of the cylinder below the piston 188a via a pneumatic conduit 194. Since the pneumatic actuator 188 is identical to pneumatic actuator 189, an elevating force is applied to the lefthand end of the structural I-beam 170 in a manner similar to that described in connection with pneumatic actuator 188.

To lower the structural I-beam 170, pneumatic fluid is permitted to escape from the actuators 188 and 189 from the region below their respective pistons. As the pneumatic fluid escapes, the pistons move downwardly, permitting the structural I-beam 170 to lower under its own weight until eventually, the entire weight of the structural I-beam 170 and the structural channel member 174 is applied via the pad 176 to the underlying lap joint 26. Sag in the center of the I-beam 170 and/or surface irregularities in the bottom surface 175 are not transmitted in a manner to damage the underlying lap joint by reason of the pad 176. At the conclusion of the lap press operation, pneumatic fluid under pressure is admitted into the actuators 188 and 189 below the piston to raise the piston of each actuator and in turn, elevate the structural I-beam. Raising and lowering of the lap press 30 occurs in timed relation to movement of the composite sheet 29 by conveyor 32 and transfer of freshly cut sheets 11 by transfer head 20'.

In an alternate lap press structure, the spacing pads 178 secured to the bottom surface 175 of I-beam flange 173 may be eliminated by the conveyor arrangement shown in FIG. 9a. As there shown, the top run of conveyor 32 is guided by rollers 196a, 196b, and 196c to pass beneath an anvil 197, thus removing the irregularities created by the spaced-apart conveyor belts 32-1, 32-2.

The release powder applicator section 36 includes an enclosed housing 200 having a planar vertical upstream wall 201, a planar vertical downstream wall 202, a top or ceiling 203, and opposite end walls 204. The housing 200 extends across the entire width of the conveyor 32. An opening 206 is provided in the upstream wall 201 through which the composite sheet 29 enters the release powder applicator housing 200. The downstream wall 202 of the housing 200 is provided with an opening 207 through which the composite sheet exits to the tensioner 38. Located within the interior of the housing 200 are three guide rolls 208, 209, and 210 which extend the entire width of the housing 200 from one end 204 thereof to the other end 204 thereof. The guide rolls 208, 209, and 210 are each mounted horizontally in suitable bearings (not shown) for rotation about their respective longitudinal axes. Guide rolls 208 and 210 are in general vertical alignment, with guide roll 209 being downstream and at an intermediate elevation relative to the guide rolls 208 and 210.

The composite sheet 29 guides over the lowermost guide roll 208 whereupon it is allowed to form a first droop region 212. The composite sheet 29 then continues vertically upwardly over the guide roll 209 to a second droop region 214. The composite sheet 29 thereafter travels vertically upwardly over guide roll 210 whereafter it exits the housing 200 via opening 207. An elongated release powder dusting unit 215, disposed horizontally within the housing 200 above the first droop region 212 below the second guide roll 209, is provided for sprinkling release powder 216 downwardly onto the surface 29-1 of the composite sheet 29 across its entire width. The dust unit 215 is in the form of a horizontally disposed elongated trough disposed transversely of composite sheet 29 having perforations in the bottom thereof through which release powder is emitted and falls downwardly onto the composite sheet surface 29-1 across its entire width. The release powder unit 215 can be of any commercially available type such as marketed by Prab Conveyor Company, Kalamazoo, Michigan, designated Tubeveyor Series 250. By virtue of the fact that the composite sheet moves in a generally vertical path from the droop region 212 to the guide roll 209, excess powder indicated generally by the reference numeral 216-1 accumulates in the droop region 212 rather than moving upwardly with the composite sheet 29 into the nip formed by the roll 209 and the composite sheet.

A second elongated horizontal release powder applicator unit 218 is provided in general vertical alignment with the droop region 214 underlying the guide roll 210. The release powder applicator unit 218, like the release powder applicator unit 215, is generally in the form of a horizontal trough which runs the entire length of the housing 200 transversely of sheet 29 with perforations in the bottom thereof for allowing release powder 220 to fall downwardly onto the second surface 29-2 of the composite sheet 29 across its entire width. By reason of the vertical path of travel of the composite sheet 29 subsequent to passing through the droop region 214, excess powder sprinkled on surface 29-2 accumulates in the droop region as indicated by reference numeral 220-1 rather than travelling upwardly into the nip formed by the third guide roll 210 and the composite sheet guiding thereover.

By reason of locating guide rolls 209 and 210 above the dust applicator units 215 and 218 over which the composite sheet 29 is guided after being sprinkled with release powder, the composite sheet follows a generally vertical path upwardly from the point underlying the respective release powder applicator units toward the overlying guide roll. As a consequence of these vertical paths subsequent to the point of release powder application, excess release powder falls downwardly under the force of gravity, preventing accumulated powder from being passed into the nip formed by the guide roll and the composite sheet. By eliminating introduction into the nip of accumulated excess release powder, there is no tendency for such accumulated excess powder to be compressed and stick to the periphery of the guide roll which, if permitted to occur, would leave imprints in the composite sheet guiding thereover.

Figure 11:
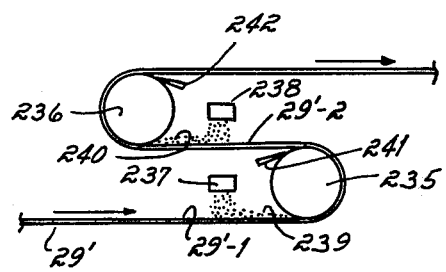
FIG. 11 is a side elevational view of a release powder applicator which does not afford the advantages of the applicator in the preferred embodiment of this invention.

A release powder applicator which does not incorporate the features of this invention, and which does result in the accumulated excess release powder being passed into the nip of the guide roll and adhering thereto such that impressions are formed in the composite sheet guiding thereover, is shown in FIG. 11. With reference to this figure, the composite sheet 29' from the pressing station is seen to guide over a horizontally disposed guide roll 235 and thence, over a second guide roll 236. Dust applicators 237 and 238 apply release powder to opposite surfaces 29'-1 and 29'-2 of the composite sheet 29'. Since the composite sheet 29' moves along horizontal paths after passing beneath release powder applicators 237 and 238 toward the guide rolls 235 and 236, excess release powder indicated by the reference numerals 239 and 240 moves into the nip formed by the guide rolls 235, 236, and the composite sheet 29'. As a result, the excess release powder is compressed between the guide roll and the composite sheet 29' causing the powder to stick to the guide roll.

To remove excess power from the guide rolls 235 and 236 and avoid providing undesirable indentations in the composite sheet 29' which guides thereover, doctor blades 241 and 242 are required to scrape the powder from the guide rolls 235 and 236. Since the composite sheet 29' has a width of forty feet or more, the guide rolls 235 and 236 and their associated doctor blades 241 and 242 must necessarily have a length of forty feet or more. While forty foot long guide rolls 235 and 236 cannot be easily avoided with forty foot wide composite sheet material, the need for forty foot long doctor blades 241 and 242 represents a substantial unnecessary expense. Not only are doctor blades of this length expensive, but mounting them and maintaining them in alignment with their respective guide rolls presents a problem. The release power applicator of FIG. 10 eliminates the need for doctor blades for the guide rolls 209 and 210, and hence represents a substantial improvement over the arrangement shown in FIG. 11.

The tensioner 38 is located between the release powder applicator 36 and the storage/take-up station 40. The tensioner 38 is designed to maintain the desired degree of tension in the composite sheet 29 upstream of the storage/take-up station notwithstanding variations in linear feed rates of the powder applicator and the take-up roll. As shown in FIG. 12a, the tensioner 38 includes a plurality of horizontal elongated tension rolls 250-1, 250-2, . . . 250-5 which are connected in end-to-end relationship. The collective length of the rolls 250-1, 250-2, . . . 250-5 is designed to exceed the width L of the composite sheet 29. The tension rolls 250-1, . . . 250-5 are interconnected in end-to-end relationship by pins 251 which seat in blind holes formed in the ends 252 of the tension rolls 250.

The tension rolls 250-1, . . . 250-5 are supported in coaxial relationship at selectively variable heights by a series of flexible cable support elements 253-1, 253-2, . . . 253-6. The cable elements 253 at their lower end each connect to a bushing support element 255 in which is rotatably positioned the pin 251 which interconnects adjacent ends of the tension rolls 250, as shown in FIG. 12b. The upper ends of the flexible cable support elements 253 are wound around spools 254-1, . . . 254-6 secured to a horizontal shaft 256 which is mounted for rotation about its horizontal axes in stationary guide bushings 257 and 258.

To rotate the shaft 256, and hence the spools 254-1, . . . 254-6 bidirectionally as desired to raise and lower the tension rolls 250-1, . . . 250-5, a spool 259 is secured to the shaft 256 between spool 254-1 and the shaft guide bushing 258. A flexible line 260 having one end 260-1 secured to a stationary support 262 has its other end connected to the spool 259. The intermediate portion of the flexible line 260 passes over stationarily mounted pulleys 264 and vertically movable pulleys 265 mounted on a vertically movable plate 266 secured to a vertical piston rod 268. The other end of the piston rod 268 is secured to a movable piston 268a which moves vertically in a stationary cylinder 268b. By admitting pressurized air into the cylinder 268b above the piston 268a via a suitable conduit 268c, the piston 268a can be urged downwardly. Downward movement of the piston 268a causes the line 260 to move in the direction of arrow 269a which in turn rotates the shaft 256 in the direction of arrow 269b. Rotation of the shaft 256 in the direction of arrow 269b winds the flexible cables 253-1, . . . 253-6 on their respective spools 254-1, . . . 254-6, elevating the tension rolls 250-1, . . . 250-5. If air is permitted to escape from the cylinder 268b above the piston 268a via the conduit 268c, the piston 268a moves upwardly, lowering the tension rolls 250-1 . . . 250-5. The ability to raise and lower the tension rolls 250-1, . . . 250-5 permits the tension in the composite sheet stock 29 which guides under the rolls to be maintained at the desired level notwithstanding variations in the speed of composite sheet stock exiting the applicator 36 and entering the take-up section 40. It also permits a preset tension to be established for the composite stock material of different widths.

An important advantage of the tensioner of this invention, shown in FIGS. 12a and 12b, is that by supporting the tension rolls 250-1, . . . 250-5 at plural positions along the length thereof, the composite tension roll does not sag in the middle. If sagging were permitted to occur, the central portion of the composite sheet 29 underlying the sagging central portion of the composite tension roll would be under greater tension than the marginal portions of the composite sheet. With a composite sheet 29 having a width L of forty feet or more, it would be virtually impossible to provide, at reasonable cost, a tension roll supported only at its opposite ends which would not sag. As indicated, such sagging provides differential tension in the composite sheet 29. With the tensioner of this invention, a nonsagging tension roll can be provided at reasonable cost having a length of forty feet or more. Such a tension roll, since it is supported at plural points along its length, need not be of as heavy construction as would be required were a single tension roll provided supported only at its opposite ends.

To accurately control the width of the composite sheet 29 stored on the mandrel 270 (271) at the storage station 40, sheet slitters 222 and 223 are provided on opposite sides of the composite sheet at a slitter station 39 located between the tensioner 38 and the storage station 40, as shown in FIG. 12a. Each slitter 222, 223, includes a motor 224 mounted on a stationary bracket 225 having a rotary cutter disc 226 connected to horizontal output shaft 227. The discs 226, 226, which are in vertical planes, are located on opposite sides of the composite sheet 29 to sever the edges thereof and provide the desired width sheet. Preferably, the motors 224, 224 are adjustable in a transverse direction relative to the direction of feed 17 of the composite sheet, to facilitate adjustably varying the width of the sheet 29.

The storage/take-up station 40, which is located downstream of the tensioner 38 and the edge trimmer 39, includes a pair of horizontal, spaced-apart, parallel reeling mandrels 270 and 271 which are disposed transverse to the direction of movement of the composite sheet 29, as shown in FIGS. 13a and 13b. The mandrels 270 and 271, which extend across the entire width of the composite sheet 29, are mounted at their opposite ends for rotation about their respective longitudinal axes by a turret structure 272 which itself is rotatably mounted for rotation about its axis of symmetry 273. Except for the fact that only one end of the turret (left end as viewed in FIG. 13b) has a drive for the mandrels 270 and 271, the turret 272 is symmetrical with respect to a center line 274. Accordingly, only the left half of the turret having the mandrel drive is described. Except for the mandrel drive, the right half of the turret 272 is a mirror image of the left half.

The turret 272, considered in more detail, includes two horizontal, spaced-apart, parallel, longitudinal frame members 275 and 276 which at their left end are welded to a hub 277. Extending outwardly from the hub 277 coaxial with the axis 273 is a shaft 277a which is journaled for rotation about axis 273 in a stationary bearing structure 278 mounted to a stationary angled frame member 279 which itself is welded to stationary horizontal and vertical frame members 280 and 281. The shaft 277a and hence the hub 277 and turret crossbeams 275 and 276 are rotated about axis 273 by a motor 284 and a gear reduction unit 285 which are mounted to the stationary frame member 279.

Extending outwardly from the turret crossmember 275 is a U-shaped frame member 286 having legs 287 and 288 welded at their inner ends to the turret crossmember 275. A pair of journal bearing elements 290 extend outwardly from the crossmember 289 of the U-shaped frame 286 for rotatably mounting the mandrel 270 for rotation about its horizontal longitudinal axis. Secured to the end of the mandrel 270 leftwardly of the bearing structure 290 is a friction roll 292. Friction roll 292 is driven, to in turn drive mandrel 270 about its horizontal axis, by a friction roll 293 mounted on the output shaft of a gear box 294 extending upwardly from the angled stationary frame member 295. A motor 296, via a gear reduction 294, drives the friction wheel 293 through the horizontal shaft 298, imparting rotary motion to the friction wheel 292 and in turn, to the mandrel 270.

The angled frame member 295 has a downwardly extending ear 300 which is pinned to an ear 301 extending rightwardly from a stationary vertical frame member 304. Air spring actuators 302 and 303, in the form of selectively variably inflatable air cushions, are positioned between opposite ends of the frame member 295 and the upper end of frame member 304 and the upper end of frame member 279. By increasing and decreasing the extent of inflation of actuators 302 and 303, respectively, a clockwise torque is applied to frame element 295 about pivot 300, 301, which is effective to urge drive wheel 293 against wheel 292 to drive mandrel 270. By decreasing and increasing the degree of inflation in air actuators 302 and 303, respectively, frame 295 rotates counterclockwise to disengage drive wheel 293 and drive wheel 292, terminating drive of the mandrel 270.

Extending outwardly from the turret crossmember 276 is a U-shaped frame 310 which has its parallel legs 311 and 312 welded at their inner end to the turret crossmember 276. The crossmember 314 of the U-shaped frame 310 has extending from it a pair of bearing elements 315 in which is rotatably mounted the mandrel 271. Secured to the outer end of the mandrel 271 is a rotary friction member 316. Rotary friction member 316 is driven from a rotary friction member 317 secured to a shaft 318 which is the output of a gear box 319 mounted on a stationary angled structural member 320. Shaft 318 is driven by a motor 321 via the reduction gear unit 319 to rotate the friction wheel 317, which in turn rotates friction wheel 316 and the mandrel 271 about its horizontal longitudinal axis. The frame member 320 has a depending ear 325 which is pinned to an ear 326 extending rightwardly from the stationary vertical frame member 281.

A selectively variably inflatable air cushion actuator 327 is mounted between the right end of stationary horizontal frame member 305 and the lower end of frame member 320. Depending upon whether the actuator 327 is inflated or deflated, frame member 320 is subjected to a counterclockwise torque or is not subjected to such a torque, respectively, engaging or disengaging drive wheel 317 and drive wheel 316, respectively, to drive or not drive, respectively, the mandrel 271. Brake shoes 330 and 331 movable toward the periphery of driven friction wheels 292 and 316 by actuators mounted to the turret frame members 275, 276 are provided for arresting motion of the mandrels 270 and 271, respectively.

Normally, the composite sheet 29 leaving the tensioner 38 and passing through the edge trimmer 39 is trained over a horizontally disposed guide roll 329 transverse to the composite sheet where it is wound on the upper mandrel 270 which is driven by the motor 296, gear reduction unit 294, shaft 298, friction wheel 293, and friction wheel 292. When the mandrel 270 is filled to capacity with composite sheet material 29, the composite sheet is severed transversely across its entire width L, connected to the empty mandrel 271, and the full mandrel 270 removed and an empty mandrel substituted in its place. This sequence is now described in connection with FIGS. 14a–14j.

FIG. 14a shows the composite sheet 29 passing over guide roll 329 where it is being wound on mandrel 270. When the mandrel 270 is filled, the turret 272 is rotated counterclockwise through approximately 180° from the position shown in FIG. 14a through the position shown in FIG. 14b to the position shown in FIG. 14c. As seen in FIG. 14c, the empty mandrel 271 is slightly above the composite sheet 29 at a point slightly downstream of the transverse guide roll 329. The turret 272 is now rotated further approximately 180° in a counterclockwise direction from the position shown in FIG. 14c through the position shown in FIG. 14d to the position shown in FIG. 14e. As the turret 272 moves counterclockwise from the position shown in FIG. 14c to the position shown in FIG. 14d, the empty mandrel 271 strikes the upper surface of the composite sheet 29 downstream of the guide roll 329, as shown in FIG. 14d. Further counterclockwise rotation of the turret 272 from the position shown in FIG. 14d to the position shown in FIG. 14e locates the empty mandrel 271 at the position it previously occupied while the composite sheet 29 was being wound on the mandrel 270 as shown in FIG. 14a.

In the position shown in FIG. 14e, the composite sheet 29 guides around the lower surface of the empty mandrel 271. With the composite sheet 29 guided underneath the empty mandrel 271, the composite sheet is severed transversely across its entire width as shown in FIG. 14e. The leading edge 29a of the composite sheet 29 is now tucked into the nip 334 formed by the upstream portion of the mandrel 270 and the composite sheet 29. The mandrel 271 is then rotated in a counterclockwise direction several turns to effectively start winding the composite sheet 29 on the mandrel 271. The full mandrel 270 is now removed as shown in FIG. 14f.

To prevent the leading edge 29a of the composite sheet 29 from pulling away from mandrel 271 after being severed, but prior to being inserted in nip 334 and wound on mandrel 271, which could occur due to the sheer weight of the composite sheet existing between roll 329 and mandrel 271 which would have a tendency to pull the freshly cut edge 29a downwardly away from mandrel 271, clamp means 350 are activated to hold the leading edge 29a in contact with the mandrel 271 during the cutting step and initial winding operation on mandrel 271. The clamp means 350 in a preferred form includes a plurality of horizontally spaced rolls 351 rotatably mounted on a horizontal shaft 352. Shaft 352 is horizontally mounted at its opposite ends between (a) the outer end of a link 353 which is pivotally mounted at its other end to a horizontal shaft 354 spanning frame element 281 and its counterpart (not shown) on the right side of the turret and (b) the end of a counterpart link (not shown) to link 353 located on the right side of the turret which is pivotally mounted at its other end to shaft 354.

A first (and second) pneumatic actuator 357 located between shaft 352 and link 353 (and its counterpart link on the right side of the turret) are provided to pivot link 353 (and its counterpart link on the right side of the turret) counterclockwise about link pivot shaft 354 from the normal solid line position to the phantom line position to urge clamp rolls 351 against mandrel 271 to clamp the composite sheet therebetween. With the sheet so clamped, it can be severed, edge 29a tucked into nip 334 and several turns rolled onto mandrel 271 without risk that the freshly cut edge 29a will pull away from the mandrel 271 under its own weight when severed.

Following the clamping, cutting, and initial reeling steps shown in FIGS. 14e and 14f, the clamp 350 is deactivated, pivoting the shaft 352 clockwise to return the clamp rolls 351 from the phantom line clamp position to their normal unclamping position shown in solid lines. The turret 272 is now rotated clockwise approximately 180° from the position shown in FIG. 14f to the position shown in FIG. 14i through the intermediate position shown in FIGS. 14g and 14h. When the empty mandrel 271 on which the leading edge 29a of the composite sheet 29 is now wound with several turns is in the position shown in FIG. 14i, the empty mandrel 271 is in the position formerly occupied by the full mandrel 270. With the mandrel 271 in this position, reeling of the composite stock 29 onto the mandrel 271 can be resumed. Additionally, a new empty mandrel 332 can be positioned where the full mandrel 270 previously was located.

An important advantage of the storage/take-up apparatus depicted in FIGS. 13a and 13b, and discussed in the mandrel change sequence drawings of FIGS. 14a–14j, is the ease with which the composite sheet 29, once disconnected from the composite sheet wound on the mandrel 270, can be reattached to the empty mandrel 271. Specifically, and as apparent particularly from FIG. 14e, the leading edge 29a of the composite stock 29, after being severed from the full roll on mandrel 270, can be attached to the new mandrel 271 by merely tucking the leading edge 29a into the nip 334 formed by the composite sheet 29 and the mandrel 271 about which it is partially wrapped, and thereafter rotating the mandrel 271 several turns to establish a good connection between the leading edge of the composite stock 29 and the mandrel 271.

Having described the invention what is claimed is:

1. A method for automatically manufacturing composite sheets of predetermined selective width and indefinite length, from stock sheet of known width and indefinite length, which includes:
    (a) feeding in a first horizontal direction along a first path stock sheet of known width and indefinite length from a supply thereof, said first path being in nonoverlapping relation to said composite sheet and spaced therefrom in a direction parallel to the length of said composite sheet,
    (b) thereafter preparing from said fed stock, while horizontally disposed along said first path in said first direction, a horizontally disposed predetermined length of said stock sheet having adhesive properties in a zone on a face of the length of stock sheet along an edge thereof, said predetermined length being a substantial multiple of said known width of said stock and at least equal to said predetermined selective width of said composite sheet,
    (c) moving said horizontally disposed predetermined length of sheet a predetermined distance along a second path in a second horizontal direction which is transverse to said first horizontal direction of feeding of said stock sheet to an overlap station which is transversely horizontally displaced from said first path a distance at least equal to said predetermined distance, said predetermined distance at least exceeding said known width of said indefinite length stock sheet, said moving of said predetermined length sheet occurring subsequent to feed-out thereof along said first path in said first direction and prior to preparing a successive predetermined length sheet,
    (d) repeating steps (a), (b) and (c) to form a composite sheet, the movement of only step (c) being such that the second length of cut sheet overlaps and contacts the first length of sheet along an overlap zone to form a lap joint with the prior cut length of sheet, said lap joint including the adhesive zone of at least one of said overlapping sheets,
    (e) moving said first and second overlapped lengths of sheets in unison further in said transverse direction along a third path by an incremental distance equal to about the width of said stock sheet less the width of said zone, and
    (f) thereafter repeating steps (b) and (c) and (e).

2. The method claimed in claim 1 wherein step (b) comprises:
    (i) feeding out said predetermined length from a stock sheet of greater length and simultaneously applying adhesive along said edge zone;
    (ii) thereafter cutting said predetermined length from said stock sheet of greater length.

3. The method claimed in claim 1 further including the step of further advancing said overlapped sheets horizontally in said transverse direction from said overlap station a distance at least equal to said known width to a pressing station and applying pressure thereat to the region of overlap of the sheets to enhance adhesion, said pressing occurring during a substantial portion of the time required to feed, move, and overlap a subsequent sheet.

4. The method claimed in claim 1 further including the step of storing the material subsequent to step (e).

5. The method claimed in claim 1 further including the step of curing the material subsequent to step (e).

6. The method of claim 4 further including the step of curing the stored material.

7. The method claimed in claim 1 further including the step of depositing an anti-adhesive agent on the material of step (e) and thereafter storing with different portions thereof in mutual contact with each other.

8. The method claimed in claim 5 further including the step of depositing an anti-adhesive agent on said material prior to curing.

9. The method of claim 3 wherein said overlapped sheets are advanced horizontally in said transverse direction from said overlap station to said pressing station a distance at least equal to approximately twice said known width less said overlap zone.

10. A method for automatically manufacturing composite cured rubber sheet of predetermined selective width, and indefinite length, from uncured stock rubber sheet of known width and indefinite length, which includes:
- (a) feeding in a first horizontal direction along a first path uncured stock rubber sheet of known width and indefinite length from a supply thereof, said first path being in nonoverlapping relation to said composite sheet and spaced therefrom in a direction parallel to the length of said composite sheet,
- (b) thereafter preparing from said fed stock, while horizontally disposed along said first path in said first direction, a horizontally disposed predetermined length of said uncured stock sheet, said predetermined length being a substantial multiple of said known width of said stock and at least equal to said predetermined selective width of said composite sheet,
- (c) moving said horizontally disposed uncured predetermined length of sheet a predetermined distance along a second path in a second horizontal direction which is transverse to said first horizontal direction of feeding of said stock sheet to an overlap station which is transversely horizontally displaced from said first path a distance at least equal to said predetermined distance, said predetermined distance at least exceeding said known width of said indefinite length stock rubber sheet, said moving of said predetermined length sheet occurring subsequent to feed-out thereof along said first path in said first direction and prior to preparing a successive predetermined length sheet,
- (d) repeating steps (b) and (c), the movement of only step (c) being such that the second length of cut sheet overlaps and contacts the first length of sheet along an overlap zone to form a lap joint with the prior cut length of sheet, said lap joint including the adhesive zone of at least one of said overlapping sheets,
- (e) moving to a pressing station said overlapped lengths of uncured sheets in unison in said transverse direction by a distance equal to about the width of said rubber stock sheet less the width of said zone,
- (f) thereafter repeating steps (b), and (c) and (e),
- (g) applying pressure to the region of overlap of the uncured sheets during a substantial portion of the time required to feed, move, and overlap a subsequent sheet,
- (h) curing the composite rubber sheet subsequent to applying pressure thereto, and
- (i) storing the cured composite rubber sheet with different portions thereof in contact with each other.

11. The method of claim 10 wherein said overlapped sheets are advanced horizontally in said transverse direction from said overlap station to said pressing station a distance at least equal to approximately twice said known width less said overlap zone.

12. A method for manufacturing composite sheet of predetermined width and indefinite length from stock sheet of known width and indefinite length, which comprises the steps of:
- (a) feeding-out along a first path in a first horizontal direction a predetermined length of said stock sheet from a supply thereof to a fully fed-out position in nonoverlapping relation to said composite sheet, said first path being in nonoverlapping relation to said composite sheet and spaced therefrom in a direction parallel to the length of said composite sheet,
- (b) cutting said stock sheet to said predetermined length, while horizontally disposed along said feed-out path in said first direction in nonoverlapping relation to said composite sheet and spaced therefrom in a direction parallel to the length of said composite sheet, said predetermined length being a substantial multiple of said known width of said stock and at least equal to said predetermined selective width of said composite sheet,
- (c) moving said cut length of sheet subsequent to feed-out thereof by said feed-out means from said fully fed-out position along said first path a predetermined distance along a second path in a second horizontal direction which is transverse to said first horizontal direction of feeding of said stock sheet, to an overlap station whereat the cut length of sheet overlaps and forms a slap joint with a prior cut length of sheet along an overlap edge zone thereof to form said composite sheet,
- (d) conveying said composite sheet of overlapped cut sheets in unison an incremental distance in said transverse direction along a third path to position a lap joint at a passing station,
- (e) applying pressure at said pressing station to a lap joint of said composite sheet to provide good adhesion, and
- (f) storing the composite sheet material with different portions thereof in contact with each other.

13. The method of claim 12 in which said feeding step feeds out approximately forty feet of stock to reach said fully fed-out position.

14. The method of claim 12 wherein said incremental distance is at least equal to approximately the width of said stock sheet less the width of said overlap zone, and wherein said predetermined distance at least exceeds said known width of said indefinite length stock sheet.

15. The method of claim 14 wherein in step (c) said cut length of sheet moves prior to cutting a successive predetermined length sheet.

16. The method of claim 15 wherein in step (d) said incremental distance is at least equal to approximately twice the width of said stock sheet less the width of said overlap zone.

17. The method of claim 14 wherein feeding-out a subsequent predetermined length sheet to a fully fed-out position in nonoverlapping relation to said composite sheet is initiated only after the preceding cut sheet of predetermined length has moved, from said fully fed-out position in said first path, along said second path in said second horizontal direction a distance at least equal to said known width of indefinite length stock.

18. The method of claim 17 wherein pressing of step (e) occurs during at least a portion of the feeding-out of step (a).

19. The method of claim 12 wherein said adhesive applying step includes the steps of:
- (a) applying at least one bead of adhesive to the edge region of the upper surface of said stock as it is being fed out,
- (b) spreading out said bead over said edge region as said adhesive-bearing stock is fed downstream of the point where said bead of adhesive is applied, and
- (c) directing an air jet against the edge region of the lower surface of said stock underlying said adhesive downstream of said adhesive application point to float said edge region on air and thereby prevent adhesive from contacting stock feed means underlying said stock downstream of said adhesive application point.

20. The method of claim 19 wherein said adhesive bead spreading step includes passing said bead-bearing stock in rolling contact with an overlying roller.

21. The method of claim 12 wherein said feeding out step includes:
(a) feeding out a section of nondefective stock sheet downstream of a first sheet severing station to locate defective stock sheet upstream of said first sheet severing station, said section having a length less than said predetermined length,
(b) severing said stock sheet at said first severing station at a point between said defective stock and nondefective stock section,
(c) feeding out defective stock and accumulating it upstream of said first severing station while said nondefective stock section downstream of said first severing station remains at rest,
(d) severing said stock at a second severing station upstream of said first severing station and said accumulated defective stock while said nondefective stock section downstream of said first severing station remains at rest,
(e) removing said accumulated defective stock from between said first and second severing stations,
(f) feeding out nondefective stock to advance the leading edge thereof to the trailing edge of said nondefective stock section at said first severing station while the latter remains at rest,
(g) joining said leading edge and said trailing edge of said nondefective stock and stock section, respectively, at said first severing station, and
(h) feeding said joined stock and stock section in synchronism until said predetermined length is fed out whereafter said predetermined length is cut.

22. The method of claim 12 wherein said moving step includes the steps of:
positioning an elongated vacuum pick-up member over and spaced above the leading edge of a cut sheet prior to movement thereof in said transverse direction,
lifting and gripping with the aid of vacuum forces the leading edge of said cut sheet underlying said elongated vacuum pick-up member,
moving said elongated vacuum pick-up member in said transverse direction to a point over and spaced above the trailing edge of said composite sheet, to thereby drag said gripped cut sheet in said transverse direction by the leading edge thereof to overlap its leading edge with the trailing edge of said composite sheet during which dragging motion wrinkles are removed from said gripped cut sheet,
releasing said leading edge of said cut sheet by termination of said vacuum force to allow said leading edge to move downwardly in overlapped relation to the trailing edge of said overlapped sheet.

23. The method of claim 22 wherein said lifting is solely with the aid of vacuum force and said downward movement of said leading edge of said cut sheet when released is solely attributable to gravity force.

24. The method of claim 12 further including the steps of:
reeling said composite sheet on a first horizontal take-up roll having a length at least equal to said predetermined width until said first take-up roll is full,
rotating a turret, which mounts said first take-up roll and an empty second take-up roll in spaced parallel relation, through approximately 360° to partially wrap said composite sheet around said second empty take-up roll,
severing said composite sheet at a point between said first full take-up roll and said second empty take-up roll,
rotating said second empty take-up roll to reel said composite sheet thereon,
removing said full take-up roll and replacing it with an empty take-up.

25. The method of claim 24 wherein said turret is further rotated approximately 180° prior to reeling said second roll to a full roll condition.

26. The method of claim 24 further including the step of:
clamping said composite sheet against said empty roll, prior to severing, upstream of said point where said sheet is to be severed, and maintaining said sheet clamped during said severing step and at least during a portion of said subsequent step of reeling said composite sheet onto said empty roll, to prevent said composite sheet upstream of said point where severed, from pulling away from said empty roll under the force of its own weight prior to said initial reeling onto said empty roll.

27. The method of claim 12 in which said feeding step feeds out stock approximately five feet wide an approximate distance of forty feet to reach said fully fed-out position.

28. A method of manufacturing composite sheet of predetermined width and indefinite length from stock sheet of known width and indefinite length, comprising the steps of:
(a) feeding-out along a first path in a first horizontal direction a predetermined length of said stock sheet from a supply thereof, said first path being in nonoverlapping relation to said composite sheet and spaced therefrom in a direction parallel to the length of said composite sheet,
(b) cutting said stock sheet, while horizontally disposed along said first path in said first direction, to said predetermined length, said predetermined length being a substantial multiple of said known width of said stock and at least equal to said predetermined selective width of said composite sheet,
(c) transferring said cut length of sheet, subsequent to feed-out thereof by said feed-out means from said fully fed-out position along said first path and prior to cutting a successive predetermined length sheet, a predetermined distance along a second path in a second horizontal direction which is transverse to said first horizontal direction of feeding of said stock sheet, to an overlap station whereat the cut length of sheet overlaps and forms a lap joint with a prior cut length of sheet along an overlap edge zone thereof to form a composite sheet, said predetermined distance at least exceeding said known width of said indefinite length stock sheet, said overlap station being transversely horizontally displaced from said first path a distance equal to said predetermined distance,
(d) moving said composite sheet of overlapped cut sheets in unison, further in said transverse direction along a third path, by an incremental distance equal to about the width of said stock sheet less the width of said overlap zone, to position a lap joint at a pressing station, (e) applying pressure at a pressing station to a lap joint of said composite sheet to provide good adhesion, said pressing occurring while feeding-out a successive cut length of sheet, and (f) storing the composite sheet material with different portions thereof in contact with each other.

29. The method of claim 28 further including the steps of:

(a) applying at least one bead of adhesive to the edge region of the upper surface of said stock as it is being fed-out, (b) spreading out said bead over said edge region as said adhesive-bearing stock is fed downstream of the point of adhesive application, (c) wherein said stock sheet feed-out step includes applying a feed-out force to the lower surface of said stock by contacting said lower surface with moving feed means located therebeneath, and (d) directing an air jet against the edge region of the lower surface of said stock underlying said adhesive downstream of the adhesive application point to float said edge region on air and thereby prevent adhesive from contacting the moving stock feed means underlying said stock downstream of said adhesive applicator point.

30. A method of manufacturing composite cured rubber sheet of predetermined width and indefinite length from uncured stock rubber sheet of known width and indefinite length, which includes the steps of:

(a) feeding out along a first path in a first horizontal direction a predetermined length of said uncured stock sheet from a supply thereof, said first path being in nonoverlapping relation to said composite sheet and spaced therefrom in a direction parallel to the length of said composite sheet, (b) cutting said uncured stock sheet, while horizontally disposed along said first path in said first direction, to said predetermined length, said predetermined length being a substantial multiple of said known width of said stock and at least equal to said predetermined selective width of said composite sheet, (c) transferring said cut length of uncured sheet, subsequent to feed-out thereof by said feed-out means from said fully fed-out position along said first path and prior to cutting a successive predetermined length sheet, a predetermined distance along a second path in a second horizontal direction which is transverse to said first horizontal direction of feeding of said uncured stock sheet, to an overlap station whereat the cut length of uncured sheet overlaps a prior cut length of uncured sheet to form a lap joint along an overlap zone to form a composite sheet, said predetermined distance at least exceeding said known width of said indefinite length stock rubber sheet, said overlap station being transversely horizontally displaced from said first path a distance equal to said predetermined distance, (d) conveying, to a pressing station, said cut lengths of uncured overlapped sheet in unison further in said transverse direction along a third path, by an incremental distance equal to about the width of said rubber stock sheet less the width of said overlap zone, (e) applying pressure at said pressing station to said overlap joint to provide good adhesion, said pressure being applied while feeding-out a successive cut length of uncured sheet, (f) curing said composite rubber sheet subsequent to applying pressure thereto, and (g) storing the cured composite rubber sheet material with different portions thereof in contact with each other.

31. The method of claim 1 wherein said composite and stock sheet is made of material which has the property of stretching under its own weight when unsupported vertically along its length, and wherein said stock sheet is vertically supported along said first and second paths and said composite sheet is vertically supported along said third path.

32. The method of claim 10 wherein said composite and stock sheet has the property of stretching under its own weight when unsupported vertically along its length, and wherein said stock sheet is vertically supported along said first and second paths and said composite sheet is vertically supported when moving to said pressing station.

33. The method of claim 12 wherein said composite and stock sheet is made of material which has the property of stretching under its own weight when unsupported vertically along its length, and wherein said stock sheet is vertically supported along said first and second paths and said composite sheet is vertically supported along said third path.

34. The method of claim 28 wherein said composite and stock sheet has the property of stretching under its own weight when unsupported vertically along its length, and wherein said stock sheet is vertically supported along said first and second paths and said composite sheet is vertically supported when moving to said pressing station.

35. The method of claim 30 wherein said composite and stock sheet is made of material which has the property of stretching under its own weight when unsupported vertically along its length, and wherein said stock sheet is vertically supported along said first and second paths and said composite sheet is vertically supported along said third path.

* * * * *